(12) United States Patent
Yoshida et al.

(10) Patent No.: US 10,706,578 B2
(45) Date of Patent: Jul. 7, 2020

(54) IMAGE PROCESSING APPARATUS, IMAGE PROCESSING METHOD AND MEDIUM STORING PROGRAM FOR DISTORTION CORRECTION

(71) Applicant: BROTHER KOGYO KABUSHIKI KAISHA, Nagoya-shi, Aichi-ken (JP)

(72) Inventors: Akidi Yoshida, Nagoya (JP); Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 287 days.

(21) Appl. No.: 15/936,771

(22) Filed: Mar. 27, 2018

(65) Prior Publication Data

US 2019/0005676 A1    Jan. 3, 2019

(30) Foreign Application Priority Data

Jun. 30, 2017  (JP) .................... 2017-128948

(51) Int. Cl.
*G06K 9/36* (2006.01)
*G06T 3/00* (2006.01)
(Continued)

(52) U.S. Cl.
CPC .............. *G06T 7/73* (2017.01); *G06K 9/6211* (2013.01); *G06T 3/0093* (2013.01); *G06T 5/006* (2013.01);
(Continued)

(58) Field of Classification Search
CPC ............ G06K 9/6211; G06K 2009/363; G06T 3/0093; G06T 5/006; G06T 7/33; G06T 7/337; G06T 7/73
See application file for complete search history.

(56) References Cited

U.S. PATENT DOCUMENTS 6,728,417 B1   4/2004 Hara et al.
2003/0151665 A1*  8/2003 Uchiyama ............... G06T 7/80
                                                            348/187

(Continued)

FOREIGN PATENT DOCUMENTS

JP   2000-241120 A   9/2000
JP   2011-180084 A   9/2011

OTHER PUBLICATIONS

Li et al. ("An accurate camera calibration for the aerial image analysis," Proceedings of the 10th International Conference on Pattern Recognition, Jun. 16-21, 1990) (Year: 1990).*

(Continued)

*Primary Examiner* — Yubin Hung
(74) *Attorney, Agent, or Firm* — Scully, Scott, Murphy & Presser, PC

(57) ABSTRACT

A non-transitory computer-readable medium stores a program. The program causes the computer to: acquire photographed image data which is generated by photographing, in an imaging apparatus, a photographed object indicating multiple reference points; acquire pieces of position information which indicate positions of the multiple reference points in the photographed image; map pieces of relative information to the respective reference points by analyzing relative positional relations between the multiple reference points in accordance with a first method; map the pieces of relative information to the respective reference points by analyzing relative positional relations between the multiple reference points in accordance with a second method; and determine a certain reference point as a reference point to be excluded, in a case that a first mapping relation is different from a second mapping relation.

20 Claims, 19 Drawing Sheets

(51) Int. Cl.
*G06T 5/00* (2006.01)
*G06T 7/73* (2017.01)
*G06T 7/33* (2017.01)
*G06K 9/62* (2006.01)

(52) U.S. Cl.
CPC ............... *G06T 7/33* (2017.01); *G06T 7/337* (2017.01); *G06K 2009/363* (2013.01)

(56) References Cited

U.S. PATENT DOCUMENTS

| | | | | |
|---|---|---|---|---|
| 2009/0066977 | A1* | 3/2009 | Yoshida | G06K 7/1417 358/1.8 |
| 2010/0232681 | A1* | 9/2010 | Fujieda | G06T 7/85 382/154 |
| 2011/0049344 | A1* | 3/2011 | Dobashi | H01J 37/222 250/252.1 |
| 2011/0305367 | A1* | 12/2011 | Osako | G06K 9/3216 382/103 |
| 2014/0313347 | A1* | 10/2014 | Wu | G06T 7/80 348/187 |
| 2017/0272728 | A1* | 9/2017 | Rafii | H04N 13/239 |
| 2019/0313070 | A1* | 10/2019 | Boujut-Burgun | H04N 9/3147 |

OTHER PUBLICATIONS

Tsai, R. ("A versatile camera calibration technique for high-accuracy 3D machine vision metrology using off-the-shelf TV cameras and lenses," IEEE Journal on Robotics and Automation, vol. 3, No. 4, Aug. 1987) (Year: 1987).*

Lin et al. ("Distortion correction for digital cameras," Proceedings SIBGRAPI'98. International Symposium on Computer Graphics, Image Processing, and Vision, Oct. 20-23, 1998) (Year: 1998).*

Stein, G.P.("Lens distortion calibration using point correspondences," Proceedings of IEEE Computer Society Conference on Computer Vision and Pattern Recognition, Jun. 17-19, 1997) (Year: 1997).*

* cited by examiner

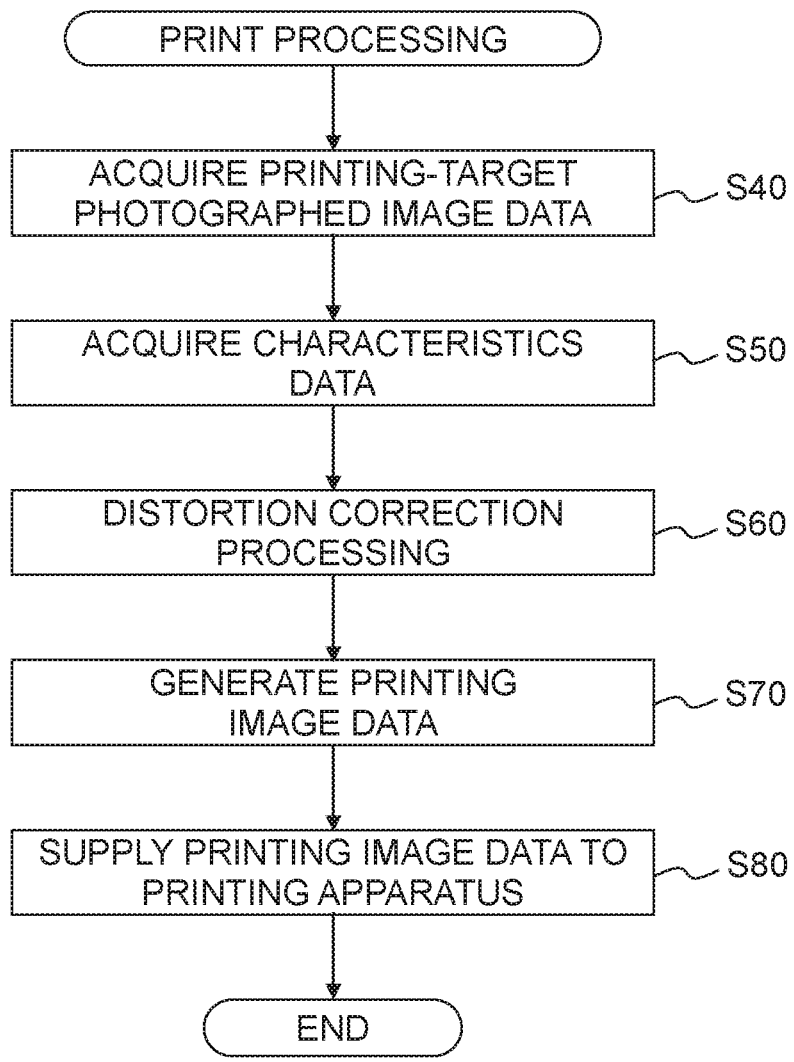

Fig. 3C
POSITION DATA PD $$\begin{matrix} (X_{11}, Y_{11}) & \cdots & (X_{1M}, Y_{1M}) \\ (X_{21}, Y_{21}) & \cdots & (X_{2M}, Y_{2M}) \\ \vdots & \ddots & \vdots \\ (X_{N1}, Y_{N1}) & \cdots & (X_{NM}, Y_{NM}) \end{matrix} \Bigg\} PD$$

Fig. 3D
CHARACTERISTICS DATA CD $$CM \left\{ \begin{matrix} f_x & 0 & c_x \\ 0 & f_y & c_y \\ 0 & 0 & 1 \end{matrix} \right. \qquad DC \left\{ \begin{matrix} k_1 & k_2 & p_1 & p_2 \end{matrix} \right.$$

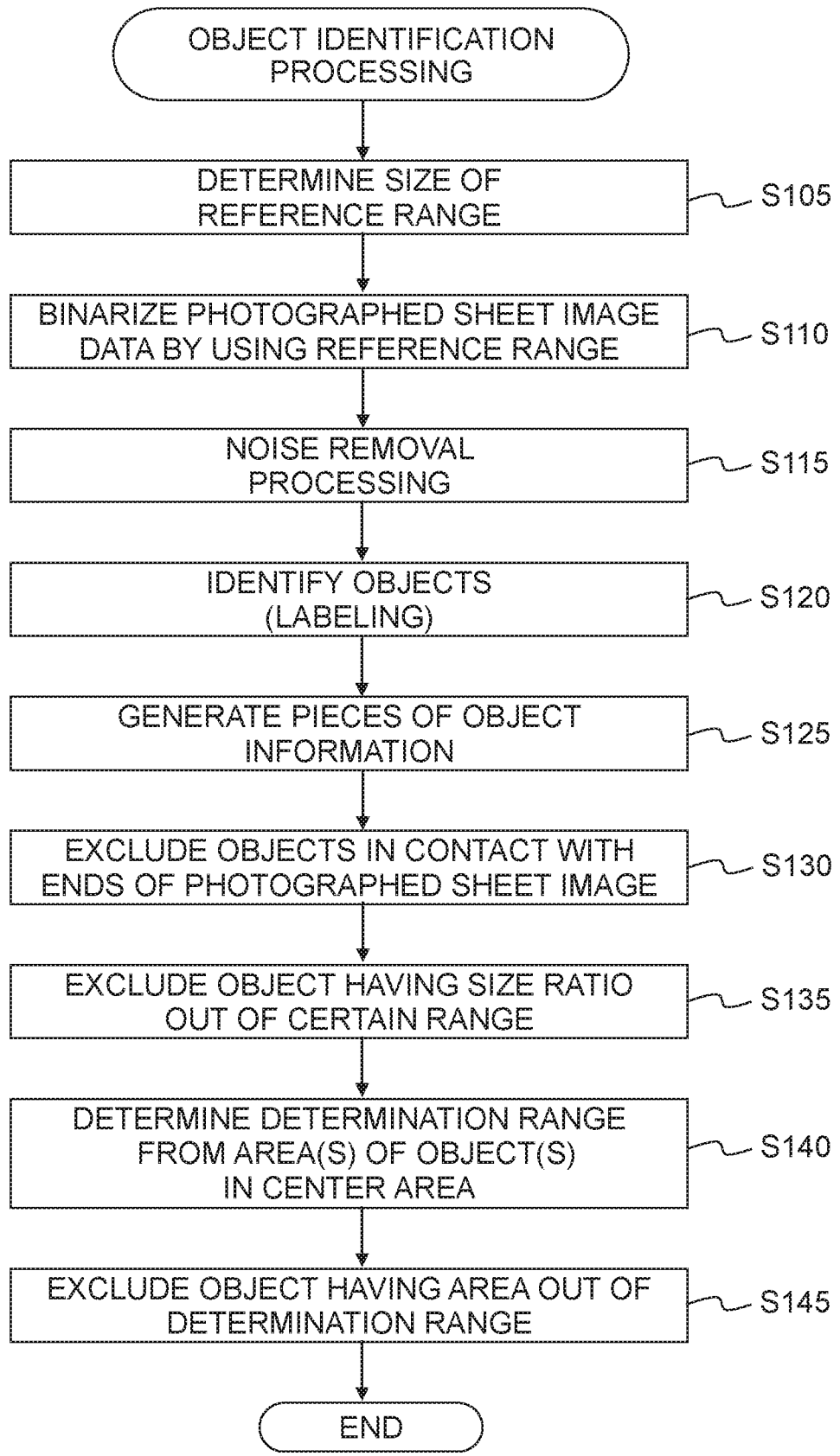

Fig. 5

OBJECT INFORMATION OD

| LABEL | WIDTH | HEIGHT | AREA | BARYCENTRIC POSITION | END POSITIONS (LEFT END, RIGHT END, UPPER END, LOWER END) | MATRIX INFORMATION |
|---|---|---|---|---|---|---|
| 1 | W1 | H1 | S1 | $(Xc1, Yc1)$ | $(Xl1, Xr1, Yu1, Yb1)$ | $(n1, m1)$ |
| 2 | W2 | H2 | S2 | $(Xc2, Yc2)$ | $(Xl2, Xr2, Yu2, Yb2)$ | $(n2, m2)$ |
| 3 | W3 | H3 | S3 | $(Xc3, Yc3)$ | $(Xl3, Xr3, Yu3, Yb3)$ | $(n3, m3)$ |
| 4 | W4 | H4 | S4 | $(Xc4, Yc4)$ | $(Xl4, Xr4, Yu4, Yb4)$ | $(n4, m4)$ |
| 5 | W5 | H5 | S5 | $(Xc5, Yc5)$ | $(Xl5, Xr5, Yu5, Yb5)$ | $(n5, m5)$ |
| j-1 | Wj-1 | Hj-1 | Sj-1 | $(Xcj-1, Ycj-1)$ | $(Xlj-1, Xrj-1, Yuj-1, Ybj-1)$ | $(nj-1, mj-1)$ |
| j | Wj | Hj | Sj | $(Xcj, Ycj)$ | $(Xlj, Xrj, Yuj, Ybj)$ | $(nj, mj)$ |

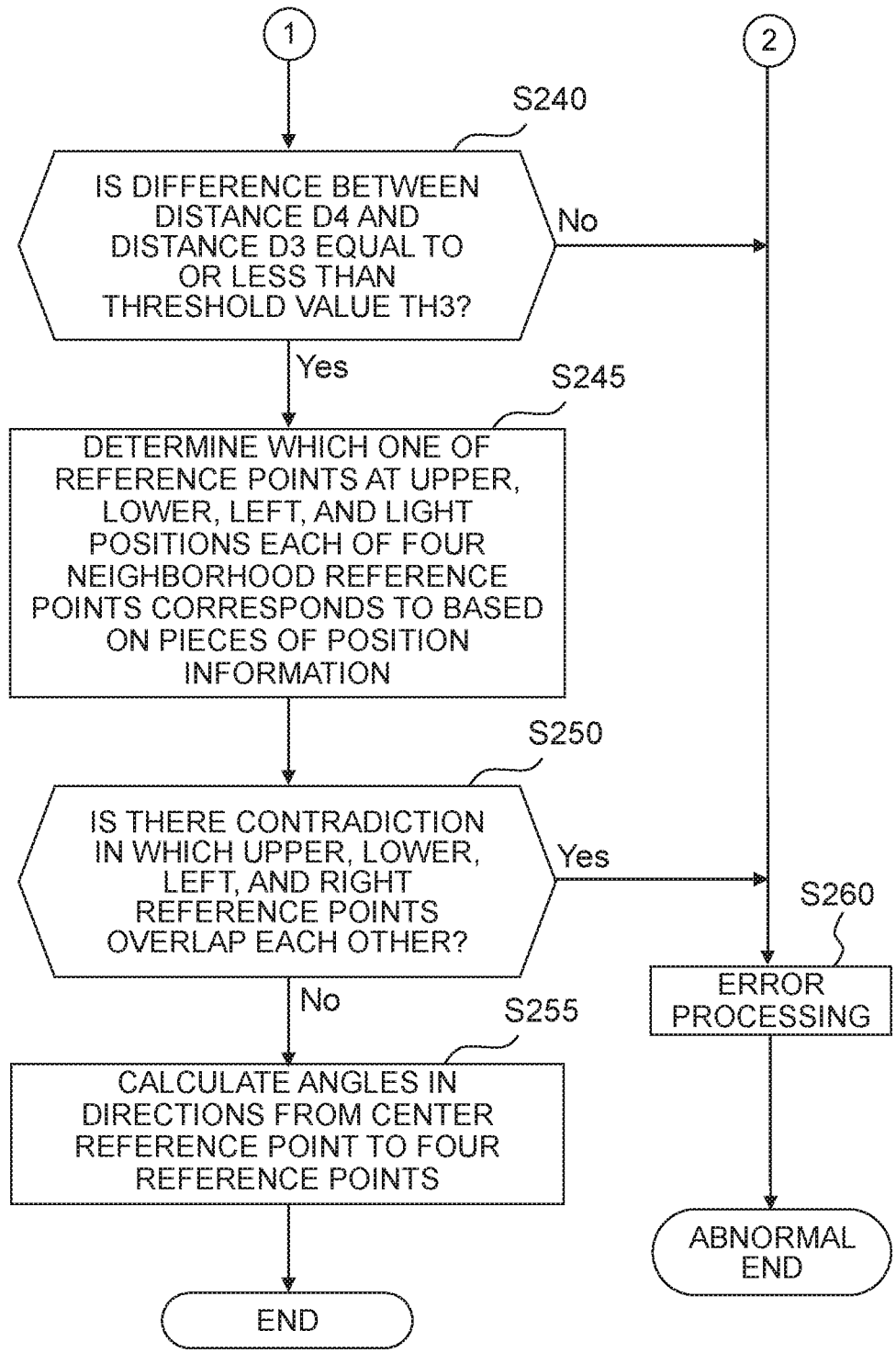

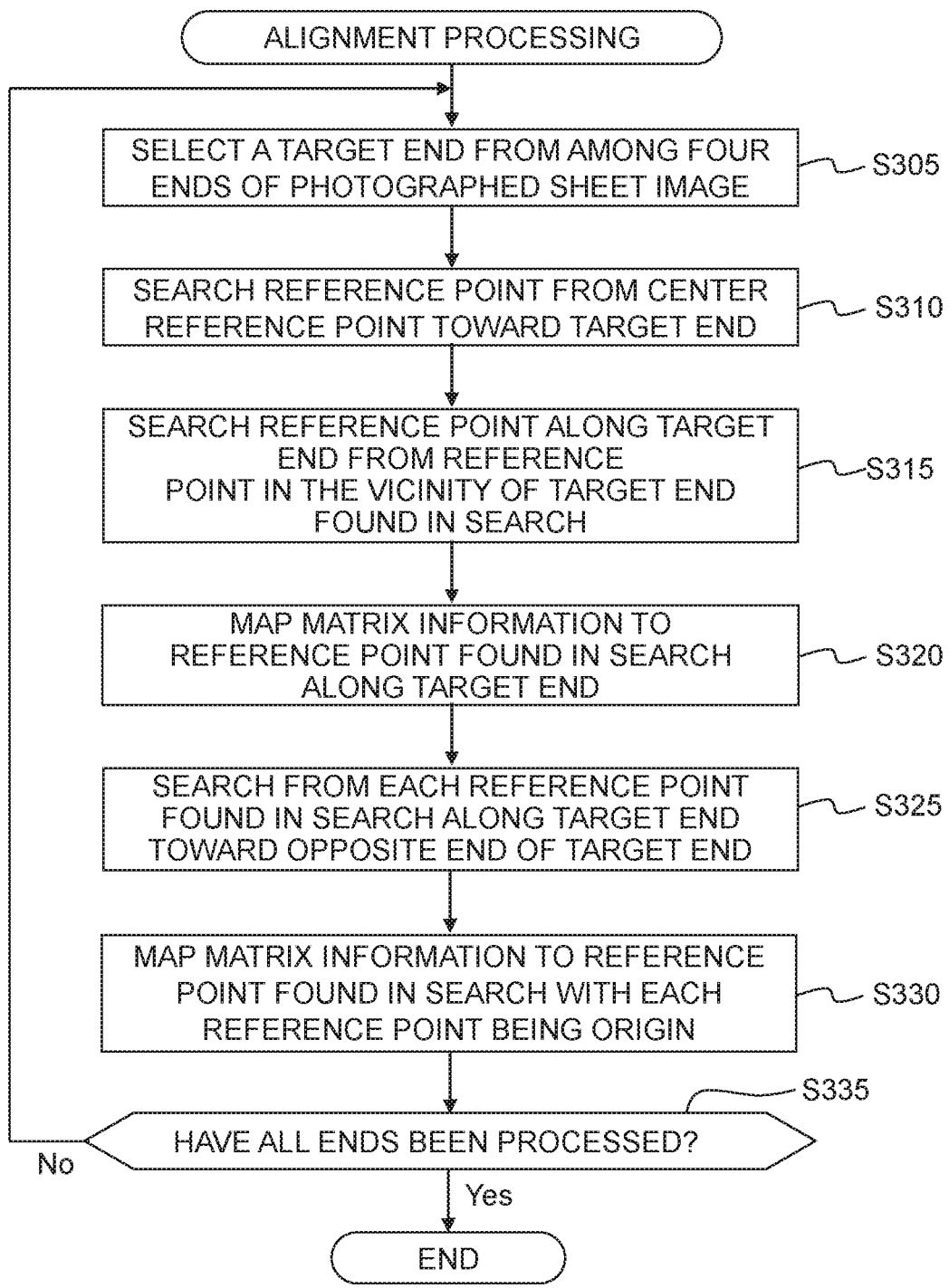

TARGET END= LEFT END

TARGET END= LEFT END

Fig. 10A

TARGET END= LEFT END

| 3 | 6 | 4 | 5 | 2 |
|---|---|---|---|---|
| 12 | 11 | 9 | 10 | 8 |
| 16 | 15 | 14 | 13 | F |
| 21 | 20 | 19 | 18 | 17 |
| 26 | 25 | F | F | F |

Fig. 10B

TARGET END= RIGHT END

| F | 3 | 6 | 4 | 5 |
|---|---|---|---|---|
| F | 12 | 11 | 9 | 10 |
| F | 16 | 15 | 14 | 13 |
| 22 | 21 | 20 | 19 | 18 |
| F | F | F | F | 24 |

Fig. 10C

TARGET END= UPPER END

| 3 | 6 | 4 | 5 | 2 |
|---|---|---|---|---|
| 12 | 11 | 9 | 10 | 8 |
| 16 | 15 | 14 | 13 | F |
| 21 | 20 | 19 | 18 | F |
| 26 | 25 | F | 24 | F |

Fig. 10D

TARGET END= LOWER END

| F | 1 | F | F | F |
|---|---|---|---|---|
| 3 | 6 | 4 | 5 | F |
| 12 | 11 | 9 | 10 | F |
| 16 | 15 | 14 | 13 | F |
| 21 | 20 | 19 | 18 | 17 |

Fig. 10E

SYNTHETIC SEARCH RESULT

| F | F | 1 | F | F | F |
|---|---|---|---|---|---|
| F | 3 | 6 | 4 | 5 | 2 |
| F | 12 | 11 | 9 | 10 | 8 |
| F | 16 | 15 | 14 | 13 | F |
| 22 | 21 | 20 | 19 | 18 | 17 |
| F | 26 | 25 | F | 24 | F |

Fig. 13A

SYNTHETIC SEARCH RESULT (BEFORE EXCLUSION)

| n\m | 3 | 6 | 4 | 5 | 2 |
|---|---|---|---|---|---|
| | 12 | 11 | 9 | 10 | 8 |
| | 16 | 15 | 14 | 13 | F |
| | 22 | 21 | 20 | 19 | 17,18 |
| | 25 | 25 | F | 24 | F |

FMTb, IM1, IM2

Fig. 13B

SYNTHETIC SEARCH RESULT (AFTER EXCLUSION)

| n\m | 3 | 6 | 4 | 5 | 2 |
|---|---|---|---|---|---|
| | 12 | 11 | 9 | 10 | 8 |
| | 16 | 15 | 14 | 13 | F |
| | 22 | 21 | 20 | 19 | F |
| | F | F | F | 24 | F |

FMTc, UERc, IM1, BERe, IM2, BERc, LECc, RECe, RECc

Fig. 13C

SYNTHETIC SEARCH RESULT (AFTER PROCESSING)

| n\m | 3 | 6 | 4 | 5 |
|---|---|---|---|---|
| | 12 | 11 | 9 | 10 |
| | 16 | 15 | 14 | 13 |
| | 22 | 21 | 20 | 19 |

FMTd

IMAGE PROCESSING APPARATUS, IMAGE PROCESSING METHOD AND MEDIUM STORING PROGRAM FOR DISTORTION CORRECTION

CROSS REFERENCE TO RELATED APPLICATION

The present application claims priority from Japanese Patent Application No. 2017-128948 filed on Jun. 30, 2017, the disclosure of which is incorporated herein by reference in its entirety.

BACKGROUND

Field of the Invention

The present specification relates to generation of position data including position information that indicates a position of a reference point in a photographed image.

Description of the Related Art

It is known that a photographed image generated by an imaging device such as a camera may have distortion caused by a lens of the imaging device. For example, Japanese Patent Application Laid-open No. 2011-180084 discloses technology of correcting such distortion. In that technology, a photographed image is acquired by photographing a distortion correction tool having dot marks provided on a matrix, and positions of the dot marks are recognized by image processing. The positions of the dot marks recognized by the image processing are compared with actual positions of the dot marks of the distortion correction tool to calculate a distortion amount in the photographed image.

SUMMARY

In the above technology, however, there is no ingenuity, for example, in generation of pieces of position information of the dot marks recognized by the image processing. Thus, there is a possibility that the position information does not correctly or appropriately indicate the position of each dot mark.

The present specification discloses a technology that generates position data including position information that correctly or appropriately indicates a position of a reference point in a photographed image.

The technology disclosed in the present specification is made to solve at least part of the above problems, and the technology can be achieved by the following examples.

According to an aspect of the present teaching, there is provided a non-transitory computer-readable medium storing a program executable by a computer that, when executed by a processor of the computer, causes the computer to: acquire photographed image data which is generated by photographing, in an imaging apparatus, a photographed object indicating multiple reference points arranged regularly with an imaging apparatus, the photographed image data indicating a photographed image of the photographed object; acquire pieces of position information which indicate positions of the multiple reference points in the photographed image by use of the photographed image data; map pieces of relative information to the respective reference points by analyzing relative positional relations between the multiple reference points in accordance with a first method using the pieces of position information, the relative information indicating the relative positional relations between the multiple reference points; map the pieces of relative information to the respective reference points by analyzing relative positional relations between the multiple reference points in accordance with a second method using the pieces of position information; determine a certain reference point as a reference point to be excluded, in a case that a first mapping relation between the certain reference point and one of the pieces of relative information mapped in accordance with the first method is different from a second mapping relation between the certain reference point and the one of the pieces of relative information mapped in accordance with the second method; and generate position data which includes the pieces of position information of reference points, among the multiple reference points, as output targets, based on mapping relations between the reference points as the output targets and the pieces of relative information, the reference points as the output targets being two or more reference points which are mapped to the pieces of relative information, the reference points as the output targets not including the reference point to be excluded.

In the above configuration, when the first mapping relation is different from the second mapping relation, the reference point to be excluded is determined. Then, the position data including the pieces of position information of two or more reference points, as output targets is generated. The reference points as output targets do not include the reference point to be excluded. Accordingly, it is possible to generate the position data including the pieces of position information that correctly indicate the positions of the reference points in the photographed image.

The technology disclosed in the present specification can be achieved in a variety of aspects. For example, the technology can be achieved in aspects including a recording medium storing a computer program, a multifunction peripheral, a scanner, a printer, an image processing method, and the like.

BRIEF DESCRIPTION OF THE DRAWINGS

FIGS. 2A and 2B are flowcharts of image processing.

FIGS. 3C and 3D depict exemplary data used for the image processing.

FIG. 4 is a flowchart of object identification processing.

FIG. 5 indicates examples of pieces of object information generated.

FIGS. 6A and 6B are a flowchart of center portion analysis processing.

FIG. 8 is a flowchart of alignment processing.

FIGS. 10A to 10E are matrixes each depicting an example of a search result.

FIGS. 13A to 13C depict synthetic search results different from that depicted in FIG. 10E.

DESCRIPTION OF THE EMBODIMENTS

<Configuration of Terminal 100>

Figure 1:
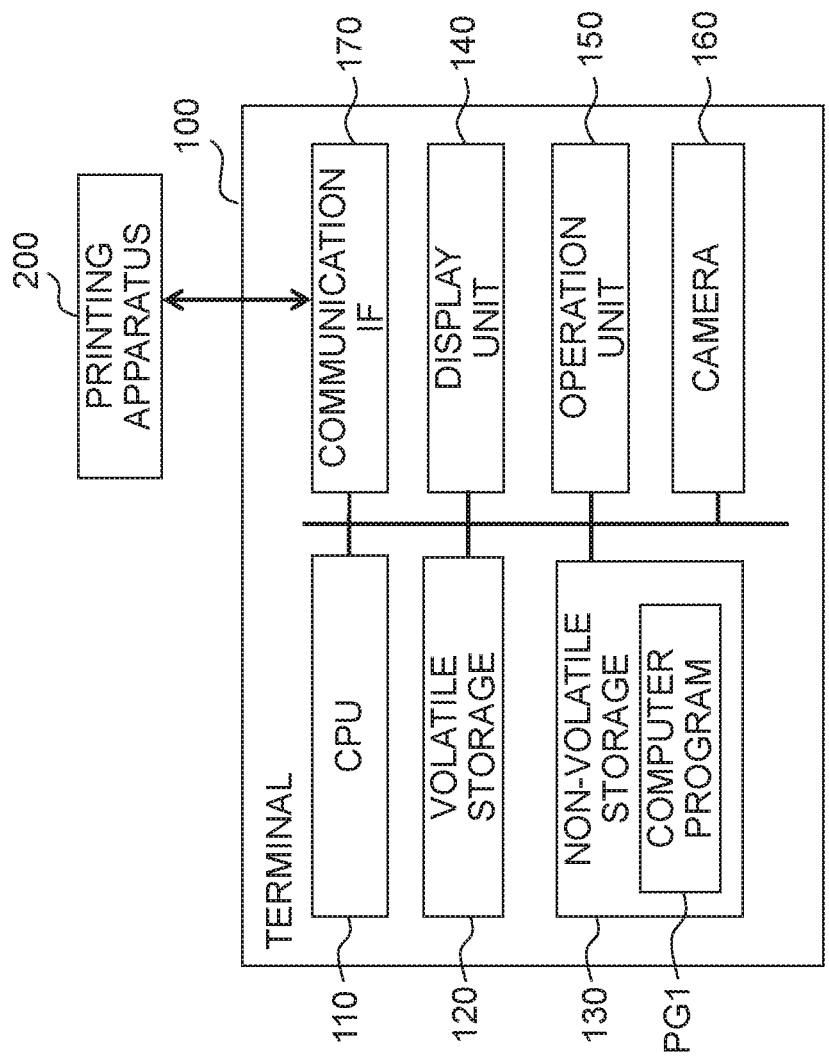
FIG. 1 is a block diagram of a configuration of a terminal that is an exemplary image processing apparatus.

An embodiment is described based on an example. A terminal 100, which is an exemplary image processing apparatus, may be a camera-equipped portable calculator, such as a smartphone. As depicted in FIG. 1, the terminal 100 includes a CPU 110 that is a processor controlling the image processing apparatus, a volatile storage 120 such as a DRAM, a non-volatile storage 130 such as a flash memory and a hard disk drive, a display unit 140 such as a liquid crystal display, an operation unit 150 including buttons and a touch panel that is overlaid with the liquid crystal display, a camera 160, and an interface (communication IF) 170 to communicate with an external apparatus, such as a printing apparatus 200.

The camera 160 includes a lens and a two-dimensional image sensor (not depicted) such as a CCD or CMOS. The camera 160 is a digital camera that optically takes an image of an object to generate photographed image data indicating a photographed image including the photographed object. The photographed image data is RGB image data including RGB values of multiple pixels or monochrome image data including luminance values of multiple pixels. The RGB value of one pixel indicates a color of the pixel. For example, the RGB value of one pixel includes three component values of red (R), green (G), and blue (B) (hereinafter also referred to as an R value, G value, and B value). In this example, each component value has 256 gradations. The luminance value indicates luminance of the pixel by using, for example, 256 gradations.

The volatile storage 120 provides a buffer area that temporarily stores a variety of intermediate data generated during the processing of the CPU 110. The non-volatile storage 130 stores a computer program PG. The computer program PG causes the CPU 110 to control the terminal 100. In this example, the computer program PG has been previously stored in the non-volatile storage 130 in the manufacture of the terminal 100. Instead of that, the computer program PG may be downloaded from a server or may be stored in a DVD-ROM or the like. The CPU 110 executes image processing described below by executing the computer program PG.

The printing apparatus 200 prints an image on a sheet by use of color materials in a predefined system (e.g., a laser system or an ink-jet system).

<Image Processing>

Figure 2A:
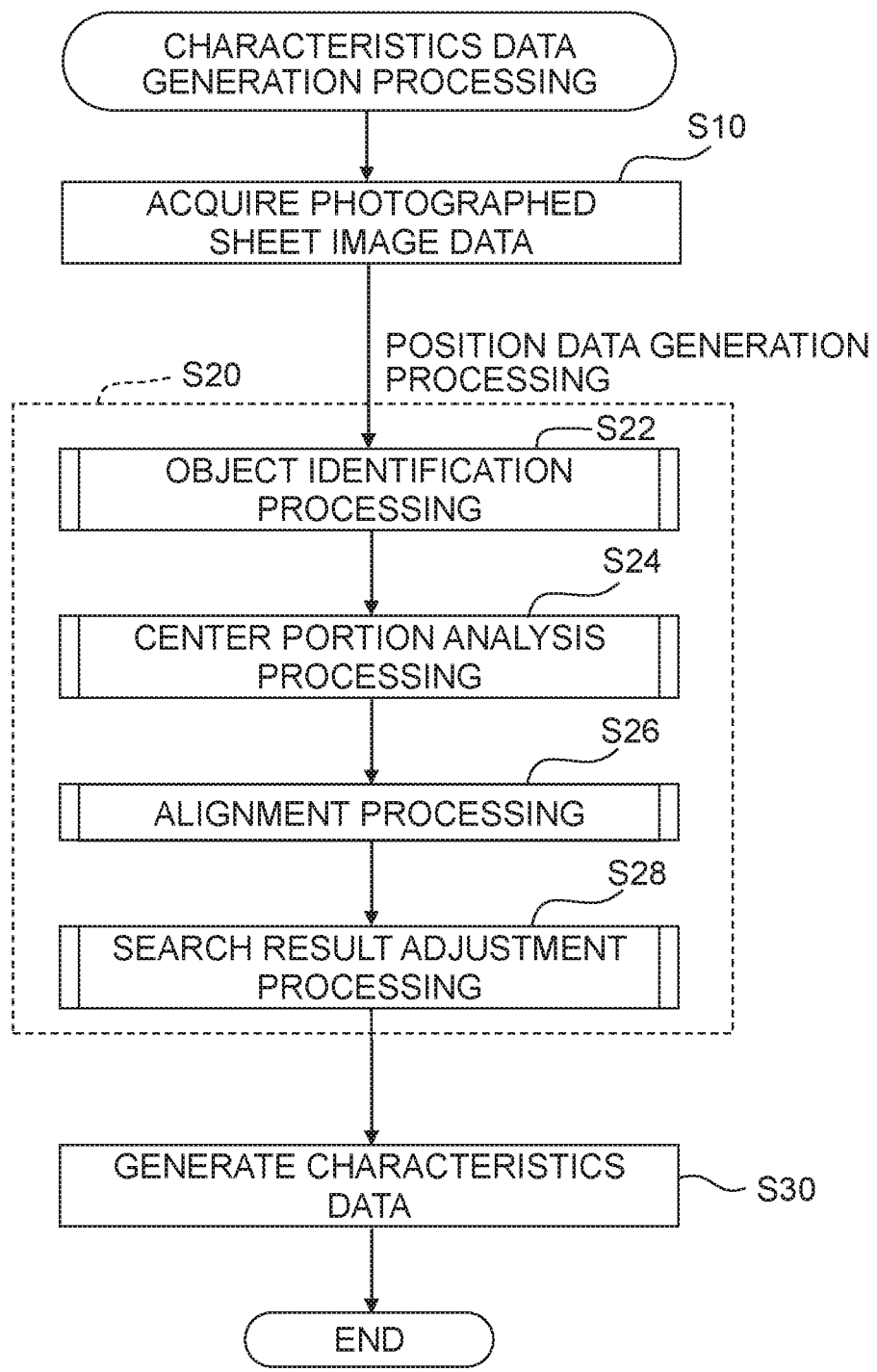

Image processing in this example includes characteristics data generation processing depicted in FIG. 2A and print processing depicted in FIG. 2B.

<Characteristics Data Generation Processing>

The characteristics data generation processing is processing of generating characteristics data CD that indicates characteristics of the camera 160 (e.g., characteristics of the lens of the camera 160) by use of photographed sheet image data, described below, acquired by photographing a sheet SH with the camera 160.

In S10 of FIG. 2A, the CPU 110 acquires the photographed sheet image data. Specifically, the CPU 110 controls the camera 160 in accordance with operation of a user to cause the camera 160 to photograph the sheet SH as an object, thus generating the photographed sheet image data. The CPU 110 stores the photographed sheet image data generated in the volatile storage 120.

Figure 3A:
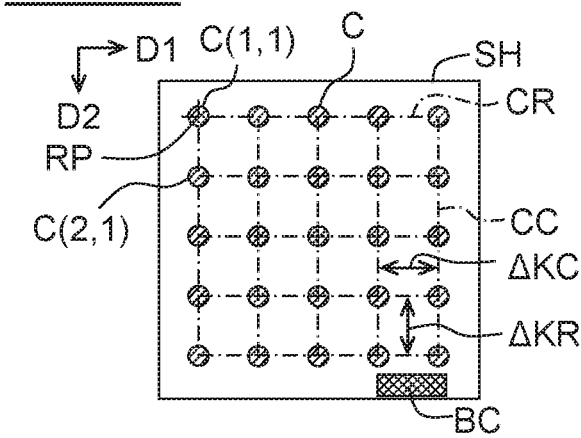
FIG. 3A depicts an exemplary sheet used for the image processing.

FIG. 3A depicts an exemplary sheet SH. The sheet SH includes an image printed thereon to generate the characteristics data. Specifically, (N×M) pieces of small circle C in total that are regularly arranged to form a matrix of N rows and M columns are printed on the sheet SH. Each of N and M is an integer equal to or more than two. Each of N and M is, for example, 30 to 100. For easy understanding, FIG. 3A depicts the sheet SH including 25 circles C of 5 rows and 5 columns.

The center of gravity of the circle C is a reference point RP. Namely, the circle C is a mark indicating the reference point RP (a reference point in the sheet SH). The respective circles are colored, for example, with a predefined color (e.g., black) and they have the same shape, the same size, and the same color. The N pieces of row and M pieces of column are linear. Intervals ΔKC between M pieces of column CC are equal to each other, and intervals ΔKR between N pieces of row CR are equal to each other. Further, the interval ΔKC between the columns CC is equal to the interval ΔKR between the rows CR (ΔKC=ΔKR). A barcode BC is printed on the sheet SH. The barcode BC indicates, for example, a product number of the sheet SH and/or the number of pieces of the circle C.

Figure 3B:
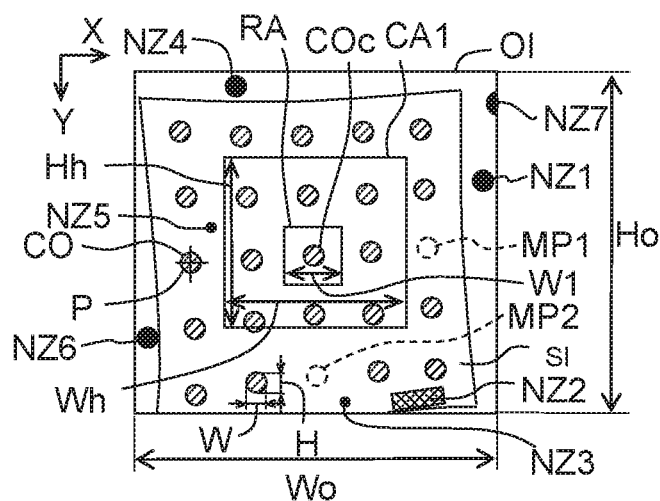
FIG. 3B depicts an exemplary image used for the image processing.

FIG. 3B depicts a photographed sheet image OI indicated by the photographed sheet image data. The photographed sheet image OI includes a sheet image SI indicating the sheet SH. The sheet image SI is distorted due to, for example, characteristics of the lens of the camera 160 (e.g., barrel or pincushion distortion). Such distortion disorders the regularity of the position, in the sheet image SI, of each of the circle objects CO indicating one of the circles C, relative to the position of each of the circles C in the sheet SH. Further, the sheet image SI may be inclined to the photographed sheet image OI by photographing the sheet SH in an inclined state. In that case, the photographed sheet image OI includes, in addition to the circle objects CO, noises NZ1 to NZ7 unrelated to the circle objects CO. The noises NZ1 to NZ7 are caused, for example, by the barcode BC in the sheet SH, dust, damage and dirt of the lens, and a shadow. Further, as depicted by MP1 and MP2 in FIG. 3B, circle objects CO indicating some circles C in the sheet SH may not appear in the photographed sheet image OI due to, for example, the way of irradiation with light over the sheet SH at the time of photographing the sheet SH. The circle objects CO indicate reference points P in the photographed sheet image OI that correspond to the reference points RP in the sheet SH. In other words, the number of reference points P identified in the sheet image SI is equal to the number of circle objects CO. Each reference point P is, for example, the center of gravity of each circle object CO.

In S20, the CPU 110 executes position data generation processing of generating position data PD that includes pieces of position information of the reference points P in the photographed sheet image OI, by use of the photographed sheet image data. The position information of each reference point P is, for example, coordinate information (the unit is a pixel) of an XY coordinate system in which an upper left vertex in the photographed sheet image OI has reference positions (0, 0).

FIG. 3C depicts exemplary position data PD. The position data PD includes (N×M) pieces of position information corresponding to 25 circles C of N rows and M columns in the sheet SH. The pieces of position information are arranged in a predefined order to identify the corresponding circles C in the sheet SH. For example, in the position data PD, position information $(X_{11}, Y_{11})$ of the reference point P corresponding to a circle C (1, 1) of the first row and the first column is arranged first; position information $(X_{21}, Y_{21})$ corresponding to a circle C (2, 1) of the second row and the first column is arranged (M+1)th; and position information ($X_{NM}$, $Y_{NM}$) corresponding to a circle C (N, M) of Nth row and Mth column is arranged (N×M)th. Details of the position data generation processing in S20 are described below.

In S30, the CPU 110 generates characteristics data CD based on the position data PD generated. The generation of the characteristics data CD is performed by a well-known method. In this example, the characteristics data CD is generated by a function "cvCalibratecamera2" disclosed in OpenCV (Intel Open Source Computer Vision Library).

FIG. 3D depicts exemplary characteristics data CD. The characteristics data CD includes, for example, a parameter matrix CM (cameraMatrix) of 3 rows and 3 columns and a distortion coefficient DC (distCoeffs) of 1 row and 4 columns. The parameter matrix CM and the distortion coefficient DC, both of which indicate characteristics of the camera, are parameter groups generated by using the above function "CalibrateCamera2". The characteristics data CD generated is stored in the non-volatile storage 130.

<Print Processing>

The print processing is processing of correcting distortion of a printing-target photographed image by use of the characteristics data, the printing-target photographed image being indicated by printing-target photographed image data that is generated by the camera 160, and printing the corrected image.

In S40 of FIG. 2B, the CPU 110 acquires the printing-target photographed image data indicating an image to be printed. The printing-target photographed image data is generated by photographing any object with the camera 160 under the same photographing conditions as those of generation of the photographed sheet image data. It can be assumed that the printing-target photographed image (not depicted) indicated by the printing-target photographed image data has distortion that is similar to that of the photographed sheet image OI.

In S50, the CPU 110 acquires the characteristics data CD, which has been generated in the characteristics data generation processing in FIG. 2A, from the non-volatile storage 130. In S60, the CPU 110 executes distortion correction processing of correcting image distortion in the printing-target photographed image data to generate corrected image data. The generation of the corrected image data is executed, for example, by using a function ("cvUndistort2" disclosed in the Open CV.

In S70, the CPU 110 generates printing image data by use of the corrected image data. Specifically, color conversion processing is executed on the corrected image data that is RGB image data. This generates CMYK image data that indicates a color of each pixel by using a CMYK value that is a color value having color components (components of C, M, Y, and K) corresponding to color materials used for printing. The color conversion processing is executed by referring to, for example, a known look-up table. Halftone processing is executed on the CMYK image data to generate, for each pixel and for each color material used for printing, dot data indicating a dot formation state. The halftone processing is executed, for example, in accordance with a dither method or an error diffusion method. The dot data is rearranged in an order used in the printing, and printing data is generated by adding a printing command to the dot data.

In S80, the CPU 110 supplies the printing data to a printing apparatus 200 as a print execution unit to cause the printing apparatus 200 to print the corrected image. In the print processing described above, it is possible to print the corrected image in which the distortion in the image caused due to the characteristics of the camera 160 has been appropriately corrected.

<Position Data Generation Processing>

The position data generation processing indicated in S20 of FIG. 2A is explained. In S22 of FIG. 2A, the CPU 110 executes object identification processing (see FIG. 4) of identifying each circle object CO in the photographed sheet image OI by use of the photographed sheet image data.

In S105, the CPU 110 determines a size of a reference range RA. Specifically, the CPU 110 calculates a length W1 (FIG. 3B) of a side of the square reference range RA by using the following formula (1).

$$W1=(Wo/M) \times Va \qquad (1)$$

Here, Wo indicates a length (a width in an X direction in this embodiment) of a long side of the photographed sheet image OI. Specifically, Wo indicates the number of pixels in a longitudinal direction of the photographed sheet image OI. M indicates the number of columns CC formed from the circles C arranged in a longitudinal direction of the sheet SH. Since the photographed sheet image OI includes the sheet image SI including almost the entirety of the sheet SH, it is considered that M is substantially equal to the number of circle objects CO arranged in the longitudinal direction of the photographed sheet image OI. Va is a coefficient for adjustment, for example, 1.5. As a result, when the center of gravity of the reference range RA matches the center of gravity of one circle object CO (e.g., the center of gravity of the circle object COc in FIG. 3B), the size of the reference range RA is determined so that the reference range RA includes the entirety of the circle object COc and does not include any other circle objects CO. For example, the length W1 of the side of the reference range RA is determined to a value that is approximately 50 to 150% of the interval ΔKC between the columns and the interval ΔKR between the rows.

As described above, in this example, the size of the reference range RA is determined by using a value (Wo/M) acquired by dividing a value (the length Wo) based on the number of pixels in the direction along the side of the photographed sheet image OI by a value (the number of columns M of the columns CC) based on the number of circle objects CO arranged in the direction along the side of the photographed sheet image OI. Thus, it is possible to appropriately determine the reference range RA for each photographed sheet image OI.

In S110, in order to generate binary data, the CPU 110 binarizes the photographed sheet image data by use of the reference range RA determined. This classifies the pixels in the photographed sheet image OI into object pixels and background pixels. Specifically, the CPU 110 calculates mean luminance Yav of values of multiple pixels around a target pixel in the reference range RA, and calculates a value of (Yav−ΔY) as a binary threshold Yth. ΔY is a predefined fixed value. The mean luminance Yav may be a weighted mean calculated by use of a Gaussian filter or may be a simple mean. When a luminance Y of the target pixel is equal to or more than the binary threshold Yth, the CPU 110 classifies the target pixel as the background pixel. When the luminance Y of the target pixel is less than the binary threshold Yth, the CPU 110 classifies the target pixel as the object pixel. The CPU 110 determines the binary threshold Yth and performs binarization using the binary threshold Yth with all the pixels in the photographed sheet image OI being as the target pixels. This appropriately identifies the multiple object pixels, for example, when the brightness of the photographed sheet image OI is not uniform such that the photographed sheet image OI includes locally dark portions and well-lighted portions. Thus, it is possible to appropriately identify the circle objects CO.

In S115, noise removal processing is executed on the binary data. This changes, for example, an isolated object pixel to the background pixel. Well known processing is adopted as the noise removal processing. For example, opening processing, in which contraction processing is executed by a predefined number of times and then expansion processing is executed by the same number of times as the contraction processing, is adopted as the noise removal processing. In the noise removal processing, although small noises (not depicted) are removed, relatively large noises, like the noises NZ1 to NZ7 depicted in FIG. 3B, are not removed.

In S120, the CPU 110 executes labeling processing to identify multiple objects formed from the object pixels. Specifically, the CPU 110 allocates a label (identifier) to a mass of object formed from continuous object pixels and allocates mutually different labels to objects separated from each other. For example, the CPU 110 allocates mutually different labels to the circle objects CO and the noises NZ1 to NZ7 depicted in FIG. 3B. The circle objects and noises are identified as different objects, respectively. The objects identified in this step are candidates for the circle object CO.

In S125, the CPU 110 generates pieces of object information OD that are pieces of information related to the multiple objects identified. FIG. 5 depicts examples of the pieces of object information OD generated.

FIG. 5 indicates pieces of object information OD of j pieces of object corresponding to 1 to j labels. The object information OD generated in S125 includes a width W, a height H, an area S, barycentric position (Xc, Yc), end positions (Xl, Xr, Yu, Yb) for each of the j pieces of object. Pieces of matrix information (n, m) indicated in FIG. 5 are not generated in this step.

The width W is the number of pixels of the corresponding object in the X direction. The height H is the number of pixels of the corresponding object in a Y direction. The area S is the number of object pixels forming the corresponding object. The barycentric position (Xc, Yc) indicates the barycentric positions of the corresponding object. Xc is, for example, an average value of X coordinates of multiple object pixels forming the object. Yc is, for example, an average value of Y coordinates of the multiple object pixels. Xl and Xr in the end positions (Xl, Xr, Yu, Yb) are the X coordinates that respectively indicate a left end position and a right end position of the corresponding object. Yu and Yb are the Y coordinates that respectively indicate an upper end position and a lower end position of the corresponding object.

In S130, the CPU 110 excludes objects, of the multiple objects identified, which are in contact with the upper, lower, left, and right ends of the photographed sheet image OI, from the candidates for the circle object CO. Specifically, the CPU 110 determines whether each object is in contact with any of the ends of the photographed sheet image OI based on the end positions (Xl, Xr, Yu, Yb) of the multiple objects described in the pieces of object information OD of FIG. 5. The CPU 110 deletes the information of the object in contact with any of the ends of the photographed sheet image OI, from the pieces of object information OD. For example, information of the noise NZ7 in FIG. 3B is deleted from the pieces of object information OD. Those other than noise would be also deleted from the pieces of object information OD. For example, when a circle object CO is in contact with any of the ends of the photographed sheet image OI, information of the circle object CO is deleted from the pieces of object information OD.

In S135, the CPU 110 determines that an object, of the multiple objects identified, having a size ratio out of a certain range SR is not the circle object CO, and then excludes that object from the candidates for the circle object CO. The size ratio is a ratio of the size in the X direction to the size in the Y direction intersecting with the X direction. Specifically, the CPU 110 calculates the size ratio (W/H) for each object based on the width W and the height H described in the object information OD of FIG. 5, and determines whether the size ratio (W/H) is in a range of 0.5 to 2 for each object. The CPU 110 deletes the object having a size ratio (W/H) that is out of the range of 0.5 to 2, from the pieces of object information OD. For example, in FIG. 3B, an object indicating the noise NZ2 that corresponds to the barcode BC is excluded from the candidates for the circle object CO.

In S140, the CPU 110 determines an area determination range JR based on an area(s) S of one or more objects, of the multiple objects identified, positioned in a center area CA1 (see FIG. 3B) of the photographed sheet image OI. The area S of the object is represented, for example, by the number of object pixels forming that object. A width Wh and a height Hh of the center area CA1 are, for example, half a width Wo and half a height Ho of the photographed sheet image OI. The center of the center area CA1 matches the center of the photographed sheet image OI. The CPU 110 calculates a central value Scv of area(s) of one or more objects (8 objects in FIG. 3B) that is/are entirely included in the center area CA1. The determination range JR is, for example, a range of $\{(1/4) \times Scv\} \leq S \leq \{(7/4) \times Scv\}$.

In S145, the CPU 110 determines that an object having an area S out of the determination range JR is not the circle object CO, and then excludes that object from the candidates for the circle object CO. Specifically, the CPU 110 calculates the areas S of the multiple objects identified and deletes the information of the object having the area S out of the determination range JR, from the pieces of object information OD. For example, in FIG. 3B, the objects indicating the small noises NZ3 and NZ5 are excluded from the candidates for the circle object CO.

The pieces of object information OD described as the pieces of object information OD at the time the object identification processing indicated in FIG. 4 is completed are current candidates for the circle object CO. Here, it can be said that the barycentric positions (Xc, Yc) of the circle objects CO described in the pieces of object information OD of FIG. 5 are pieces of position information indicating the positions of the reference points P. Thus, it can be said that, at the time the object identification processing in FIG. 4 is completed, multiple reference points P in the photographed sheet image OI are identified and pieces of position information indicating the positions of the reference points P are generated.

According to the object identification processing, the determination range JR that is a criterial range of the number of pixels is determined based on the number of pixels of the object(s) in the center area CA1 (S140), and whether each of the multiple objects is the circle object CO is determined based on whether each of the multiple objects has the number of pixels within the determination range JR (S145). Accordingly, whether the objects in the photographed sheet image OI are the circle objects CO are determined appropriately.

For example, even when the proportion of the sheet image SI in the photographed sheet image OI is small, such as a case in which the sheet SH is photographed at a position relatively away from the sheet SH, the center area CA1 is highly likely to be occupied by the sheet image SI. Thus, the determination range JR is determined appropriately. Further, since all the circles C in the sheet SH have the same area, the area S of each circle object CO is considered to be arranged in the determination range JR of the photographed sheet image OI. Thus, the object having an area S out of the determination range JR is considered to be an object different from the circle object CO (e.g., noise).

In the object identification processing, whether each of the multiple objects is the circle object CO is determined based on whether each of the multiple objects has a size ratio in the certain range SR (S135). As a result, whether each object in the photographed sheet image OI is the circle object CO is determined appropriately, thus making it possible to appropriately generate the position data PD. For example, since the circle C in the sheet SH is a true circle and the size ratio thereof is 1, it is considered that the size ratio of the circle object CO is arranged in the certain range SR of the photographed sheet image OI. Namely, the object having a size ratio out of the certain range SR is considered to be an object different from the circle object CO (e.g., noise).

In the object identification processing, the CPU 110 determines that the object in contact with any of the ends of the photographed sheet image OI is not the circle object CO indicating the reference point P that is to be an output target (S130). As a result, whether each object in the photographed sheet image OI is the circle object CO indicating the reference point P that is to be the output target is determined appropriately. For example, the object positioned at any of the ends of the photographed sheet image OI is likely to indicate, for example, a foreign matter positioned outside the sheet SH. If the circle object CO indicating the circle C in the sheet SH is present at any of the ends of the photographed sheet image OI, the circle object CO is not likely to indicate the entirety of the circle C. Thus, it is highly possible that the reference point P based on the circle object CO can not be identified with high accuracy, and it is considered that the reference point P based on that circle object CO should not be made to be the output target.

Figure 6A:
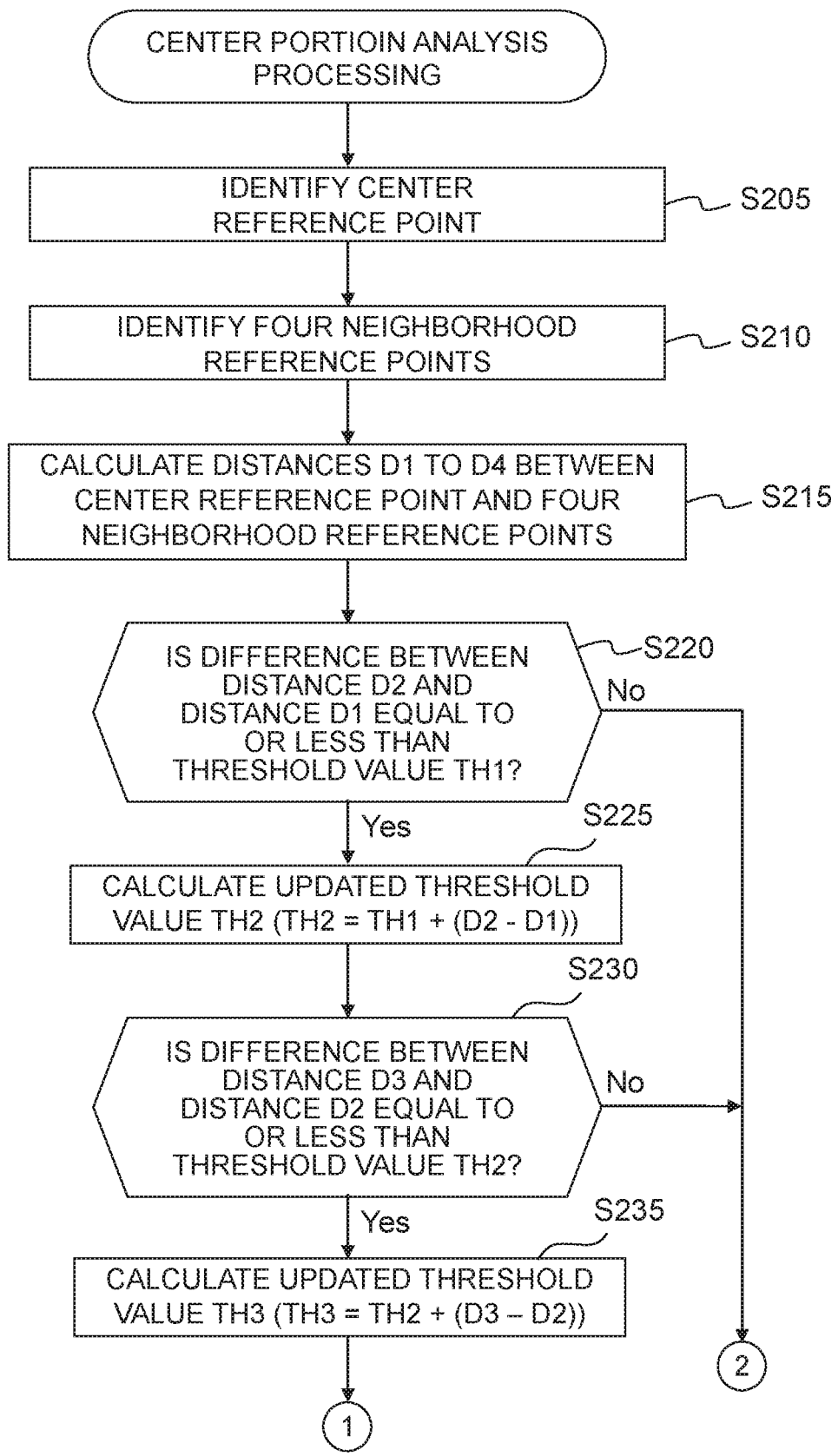
Figure 7:
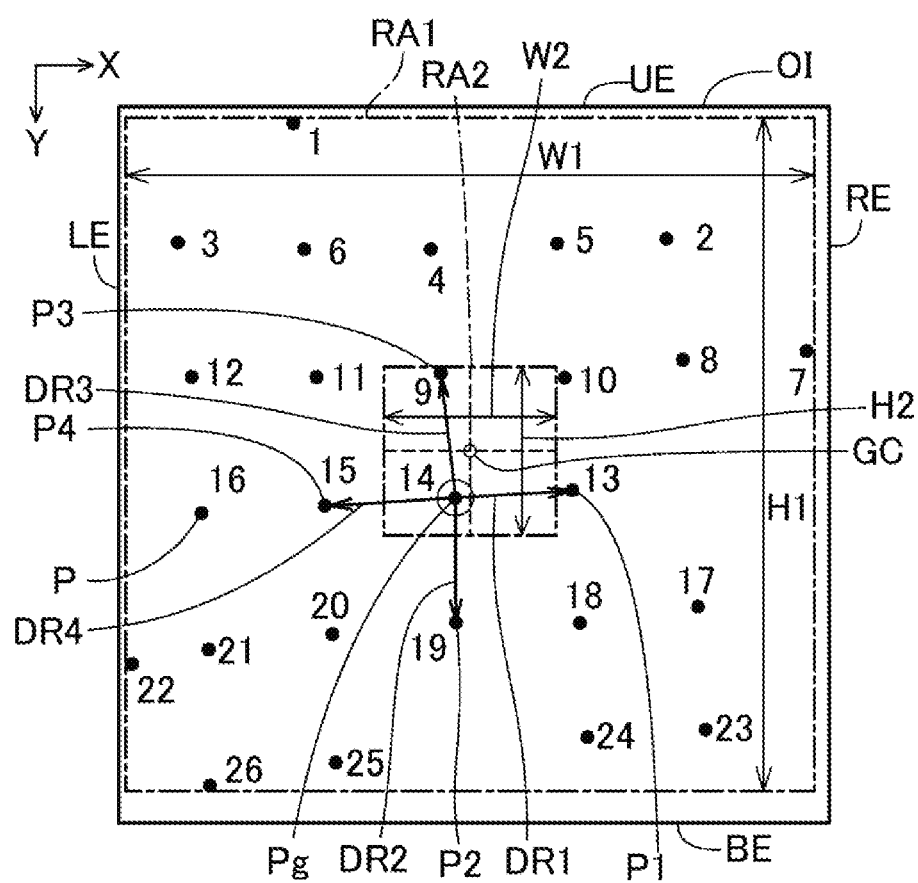
FIG. 7 depicts reference points identified in a photographed sheet image.

In S24 of FIG. 2, the CPU 110 executes center portion analysis processing (see FIGS. 6A, 6B and 7) for analyzing a center portion of the photographed sheet image OI. In FIG. 7, numbers 1 to 26 for distinguishing the respective reference points are given to the reference points represented by the black circles. The fifth reference point P is also described, for example, as a reference point P (5).

In S205, the CPU 110 identifies a center reference point Pg among the reference points P. The CPU 110 identifies a circumscribed rectangle RA1 circumscribing a point group formed by all the reference points P identified (see FIG. 7). The CPU 110 identifies a center rectangle RA2 of which center is a center GC of the circumscribed rectangle RA1 and which is smaller than the circumscribed rectangle RA1. A width W2 and a height H2 of the center rectangle RA2 are values that are 25% of a width W1 and a height H2 of the center rectangle RA1 (W2=0.25×W1, H2=0.25×H1). The CPU 110 identifies a reference point P, of one or more of the reference points P included in the center rectangle RA2, closest to the center GC of the center rectangle RA2 and the circumscribed rectangle RA1, as the center reference point Pg. In FIG. 7, the center reference point Pg is a reference point P (14).

In S210, the CPU 110 identifies four neighborhood reference points P1 to P4 positioned in the vicinity of the center reference point Pg. The four neighborhood reference points P1 to P4 are four reference points P, of multiple reference points P, of which distances to the center reference point Pg are first to fourth shortest. In other words, the four neighborhood reference points P1 to P4 are reference points, of the multiple reference points P from which the center reference point Pg is excluded, of which distances to the center reference point Pg are shorter than remaining other reference points P.

In S215, the CPU 110 calculates distances between the center reference point Pg and the four neighborhood reference points P1 to P4. Here, the four neighborhood reference points P1 to P4 are defined as neighborhood reference points P1 to P4 in an order of a shorter distance to the center reference point Pg. Further, the distances between the center reference point Pg and the neighbor reference points P1 to P4 are defined as distances D1 to D4 in an order of a shorter distance. In FIG. 7, for example, the neighborhood reference point P1 is a reference point P positioned on the right of the center reference point Pg. The neighborhood reference point P2, the neighborhood reference point P3, and the neighborhood reference point P4 are reference points P positioned on the lower side, upper side, and left side of the center reference point Pg, respectively.

In S220, the CPU 110 determines whether a difference (D2−D1) between a distance D2 from the center reference point Pg to the neighborhood reference point P2 and a distance D1 from the center reference point Pg to the neighborhood reference point P1 is equal to or less than a threshold value TH1. When the difference (D2−D1) is equal to or less than the threshold value TH1 (S220: YES), the CPU 110 proceeds to S225. When the difference (D2−D1) is larger than the threshold value TH1 (S220: NO), the CPU 110 proceeds to S260.

In S225, the CPU 110 calculates an updated threshold value TH2 by using the difference (D2−D1). Specifically, the updated threshold value TH2 is the sum of the threshold value TH1 and the difference (D2−D1) (TH2=TH1+(D2−D1)).

In S230, the CPU 110 determines whether a difference (D3−D2) between a distance D3 from the center reference point Pg to the neighborhood reference point P3 and the distance D2 from the center reference point Pg to the neighborhood reference point P2 is equal to or less than a threshold value TH2. When the difference (D3−D2) is equal to or less than the updated threshold value TH2 (S230: YES), the CPU 110 proceeds to S235. When the difference (D3−D2) is larger than the updated threshold value TH2 (S230: NO), the CPU 110 proceeds to S260.

In S235, the CPU 110 calculates an updated threshold value TH3 by use of the difference (D3−D2). Specifically, the updated threshold value TH3 is the sum of the updated threshold value TH2 and the difference (D3−D2) (TH3=TH2+(D3−D2)).

In S240, the CPU 110 determines whether a difference (D4−D3) between a distance D4 from the center reference point Pg to the neighborhood reference point P4 and the distance D3 from the center reference point Pg to the neighborhood reference point P3 is equal to or less than the threshold value TH3. When the difference (D4−D3) is equal to or less than the threshold value TH3 (S240: YES), the CPU 110 proceeds to S245. When the difference (D4−D3) is larger than the threshold value TH3 (S240: NO), the CPU 110 proceeds to S260.

In S245, the CPU 110 determines, based on the pieces of position information of the neighborhood reference points P1 to P4 (see FIG. 5), whether each of the neighborhood reference points P1 to P4 corresponds to which one of the neighborhood reference points positioned at the upper, lower, left, and right positions. Specifically, a reference point, of the neighborhood reference points P1 to P4, of which Y coordinate indicates the uppermost position (i.e., a reference point of which Y coordinate is the smallest) is determined to be the upper reference point. A reference point, of the neighborhood reference points P1 to P4, of which Y coordinate indicates the lowermost position (i.e., a reference point of which Y coordinate is the largest) is determined to be the lower reference point. A reference point, of the neighborhood reference points P1 to P4, of which X coordinate indicates the leftmost position (i.e., a reference point of which X coordinate is the smallest) is determined to be the left reference point. A reference point, of the neighborhood reference points P1 to P4, of which X coordinate indicates the rightmost position (i.e., a reference point of which X coordinate is the largest) is determined to be the right reference point.

In S250, the CPU 110 determines whether the determination about the neighborhood reference points P1 to P4 in S245 has contradiction in which the upper, lower, left, and right reference points overlap with each other. When it is determined that the neighborhood reference points P1 to P4 have no overlap and each of the reference points P1 to P4 corresponds to any of the four reference points positioned at the upper, lower, left, and right positions, it is determined that there is no contradiction. When it is determined that a certain reference point of the neighborhood reference points P1 to P4 corresponds to two or more reference points of the four reference points positioned at the upper, lower, left, and right positions, it is determined that there is contradiction. For example, when it is determined that a certain reference point corresponds not only to the upper reference point but also to the left reference point, it is determined that there is contradiction.

When there is no contradiction (S250: NO), the CPU 110 proceeds to S225. When there is contradiction (S250: YES), the CPU 110 proceeds to S260.

In S255, the CPU 110 calculates angles θ1 to θ4 in four directions DR1 to DR4 (see FIG. 7) directed from the center reference point Pg to the neighborhood reference points P1 to P4. For example, each of the angles θ1 to θ4 is an angle with respect to the X direction. After calculation of the angles θ1 to θ4, the center portion analysis processing ends.

When the CPU 110 proceeds to S260, it is considered that the photographed sheet image data is incorrect. For example, when any of the differences (D2−D1), (D3−D2), and (D4−D3) is too large, it is highly likely that the neighborhood reference points P1 to P4 are erroneously identified. Similarly, when it is determined in S250 that the neighborhood reference points P1 to P4 have contradiction, it is highly likely that the neighborhood reference points P1 to P4 are erroneously identified. When the neighborhood reference points P1 to P4 are erroneously identified at a center portion having distortion smaller than the ends, it is highly likely that any inconvenience, such as too many noises are included in the photographed sheet image OI, the photographed sheet image OI is too dark, or the photographed sheet image OI is too bright, is caused.

It is considered that the distortion in the image is larger as the differences (D2−D1) and (D3−D2) are larger. It is considered that those differences are larger at positions further separated from the center reference point Pg. Thus, it is considered to be appropriate that the threshold value TH2 to be compared to the difference (D3−D2) is increased as the difference (D2−D1) is larger, and that the threshold value TH3 to be compared to the difference (D4−D3) is increased as the difference (D3−D2) is larger. Thus, as indicated in S S225 and S235, the threshold values to be compared to the differences (D3−D2) and (D4−D3) are gradually increased depending on the differences (D2−D1) and (D3−D2).

In S260, the CPU 110 executes error processing to abnormally end the image processing. The error processing includes, for example, a notification indicating that the photographed sheet image data is incorrect and a notification by which a user is notified of the necessity in which the sheet SH is photographed again to generate new characteristics data CD. For example, a message indicating those notifications is displayed on the display unit 140.

In S26 of FIG. 2, the CPU 110 executes alignment processing. The alignment processing is processing in which the pieces of matrix information (n, m) of FIG. 5 are mapped to the respective reference points P by analyzing relative positional relations between the multiple reference points P by use of the pieces of position information of the multiple reference points P. The matrix information (n, m) indicates a row and a column at which a reference point P is positioned with reference to a certain reference point P (e.g., the center reference point Pg). For example, since the sheet SH indicates the reference points RP of N rows and M columns (5 rows and 5 columns in FIG. 3A), the reference points P in the photographed sheet image OI can be mapped to pieces of matrix information (n, m) of N rows and M columns. For example, when the matrix information to be mapped to the center reference point Pg is (n1, m1), the matrix information of the reference point, which is positioned at the same column as the center reference point Pg and at a row lower than that of the center reference point Pg, is (n1+1, m1). Accordingly, it can be also said that the matrix information indicates the relative positional relation between the multiple reference points.

In S305 of FIG. 8, the CPU 110 selects a target end from among the four ends of the photographed sheet image OI (i.e., an upper end UE, a lower end BE, a left end LE, and a right end RE).

In S310, the CPU 110 searches a reference point P from the center reference point Pg to the target end. The search for the reference point P in a search direction is executed by using a distance (referred to as a search distance Dt), of the distances D1 to D4, from the center reference point Pg to the neighborhood reference point positioned in the search direction and an angle (referred to as a search angle θt), of the angles θ1 to θ4, in a direction directed from the center reference point Pg to the neighborhood reference point positioned in the search direction. For example, the search, of which search direction is a direction towards the left end LE of FIG. 7 (specifically, the direction DR4 of FIG. 7), is executed by using the distance D4 from the center reference point Pg to the neighborhood reference point P4 and an angle θ4 in the direction DR4 from the center reference point Pg to the neighborhood reference point P4.

Specifically, the CPU 110 searches a reference point P satisfying the following conditions (1) and (2).

Condition (1): An absolute value of a difference (D−Dt) between a distance D from an origin to the reference point P and the search distance Dt is equal to or less than a threshold value Dth ($|D-Dt| \leq Dth$).

Condition (2): An absolute value of a difference (θ−θt) between an angle θ in a direction from an origin to the reference point P and the search angle θ is equal to or less than a threshold value θth ($|\theta-\theta t| \leq \theta th$).

Here, the threshold value Dth is, for example, one-fourth (¼) of the search distance Dt (Dth=(Dt/4)). The threshold value θth is, for example, 10°.

The CPU 110 executes the search with the center reference point Pg being the origin. When the reference point P satisfying the conditions (1) and (2) is found in the search, the CPU 110 searches the next reference point with the reference point P searched being the origin. Then, the CPU 110 repeats the search while updating the origin until the reference point P satisfying the conditions (1) and (2) is no longer found.

Figure 9A:
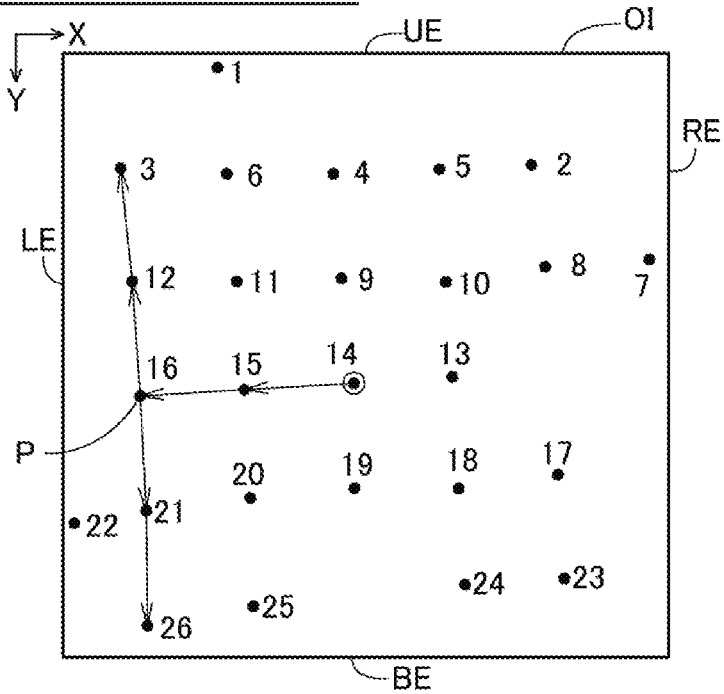
FIGS. 9A and 9B are first illustrative views of alignment processing.

For example, as depicted in FIG. 9A, when the reference point P (14) is the center reference point Pg and the target end is the left end LE, a reference point P (15) and a reference point (16) positioned on the left of the reference point P(14) are found in the search. The reference point P(16) found last is a reference point positioned in the vicinity of the target end (the left end LE in FIG. 9A).

In S315, the CPU 110 searches a reference point P, along the target end, from the reference point P in the vicinity of the target end that has been found in S310. When the target end is the left end LE, the reference point P is searched with an upper direction (specifically, the direction DR3 in FIG. 7) and a lower direction (specifically, the direction DR2 in FIG. 7) being the search directions. In FIG. 9A, the search is executed in the upper direction with the reference point P (16) being the origin and a reference point (12) and a reference point (3) are found in the search. Further, the search is executed in the lower direction with the reference point P(16) being the origin and a reference point P(21) and a reference point P(26) are found in the search.

In S320, the CPU 110 maps the matrix information (n, m) to the reference point P found in the search along the target end. For example, when the target end is the left end LE in FIG. 9A, the five reference points P(3), P(12), P(16), P(21), and P(26) found in the search along the target end are considered to correspond to a left end column of the matrix of 5 rows×5 columns. Thus, five pieces of matrix information (1, 1), (2, 1), (3, 1), (4, 1), and (5, 1) indicating the left end column are mapped to the reference points P(3), P(12), P(16), P(21), and P(26), respectively.

Figure 9B:
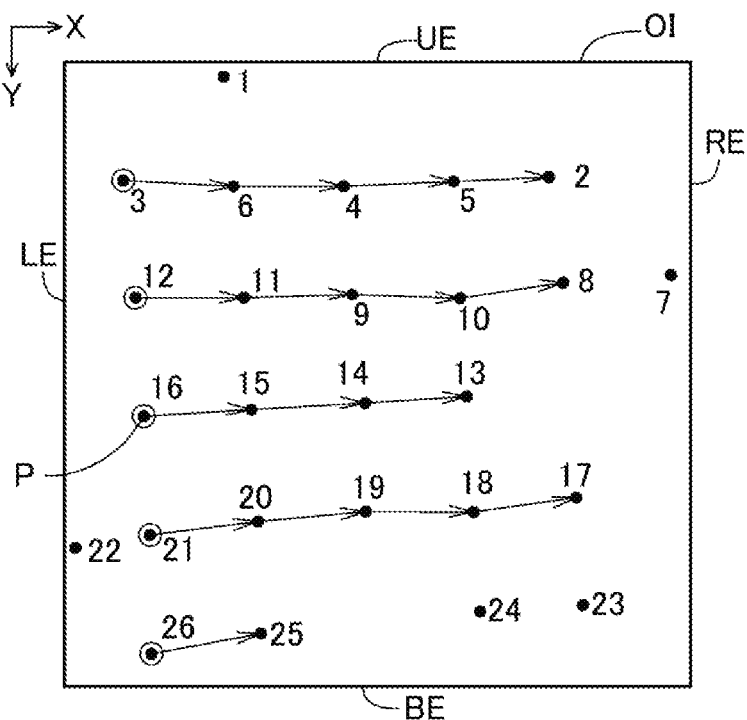

In S325, the CPU 110 searches a reference point P from each reference point P found in the search along the target end toward an opposite end of the target end. In FIG. 9B, the reference point P is searched, toward the right end RE (specifically, in the direction DR1 in FIG. 7), from the respective five reference points P(3), P(12), P(16), P(21), and P(26) along the left end LE. As a result, as depicted in FIG. 9(B), in the search with the reference point P(3) being the origin, four reference points P(6), P(4), P(5), and P(2) are found. In the search with the reference point P(26) being the origin, only a reference point P(25) is found and reference points P(24) and P(23) are not found. This is because, the reference point P that should be present between the reference point P(25) and the reference point P(24) is not identified in the photographed sheet image OI.

In S330, the CPU 110 maps the reference point found in the search with each reference point being the origin, to the matrix information. For example, in FIG. 9B, the pieces of matrix information are mapped to 16 reference points, which are found in the search with the five reference points P(3), P(12), P(16), P(21), and P(26) along the left end LE being the origins. For example, since four reference points P(6), P(4), P(5), and P(2) are found in the search with the upper left reference point P(3) being the origin, the pieces of matrix information (1, 2), (1, 3), (1, 4), and (1, 5) are mapped to those reference points.

Examples of search results can be represented by matrices in FIGS. 10A to 10E. In the matrices in FIGS. 10A to 10E, each square corresponding to the matrix information (n, m) of 5 rows and 5 columns has the corresponding reference point P number. Thus, each of the matrices in FIG. 10A to 10E allows the CPU 110 to get the matrix information mapped to the reference point P in the alignment processing. FIG. 10A depicts a search result ML when the target end is the left end LE. The square with "F" indicates that the reference point mapped to the matrix information corresponding to the square was not found in the search.

In S335, the CPU 110 determines whether all the ends UE, BE, LE, and RE have been processed as the target ends. When there is an end that is not yet processed (S335: NO), the CPU 110 returns to S305. When all the ends have been processed (S335: YES), the CPU 110 ends the alignment processing.

Figure 11A:
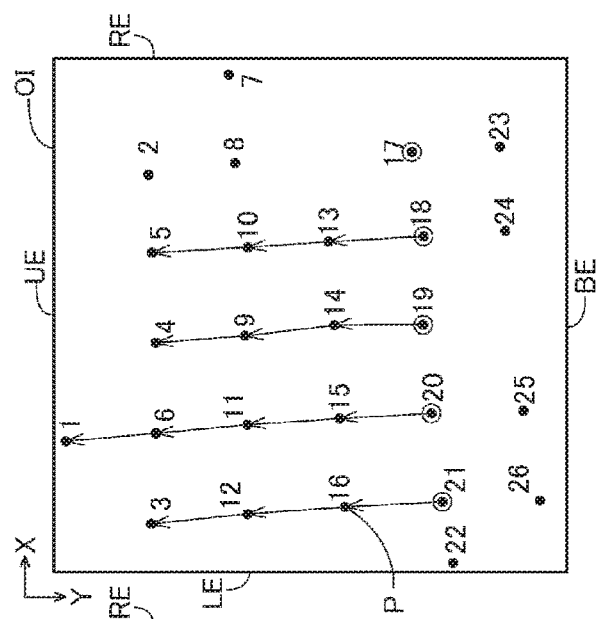
FIGS. 11A to 11C are second illustrative views of the alignment processing.
Figure 11B:
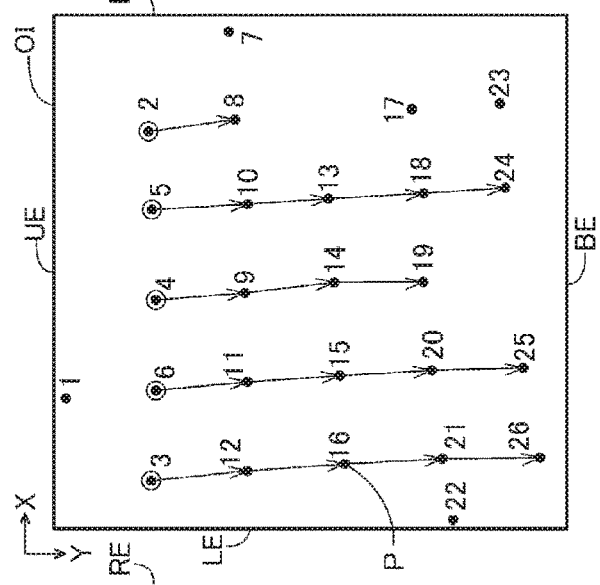
Figure 11C:
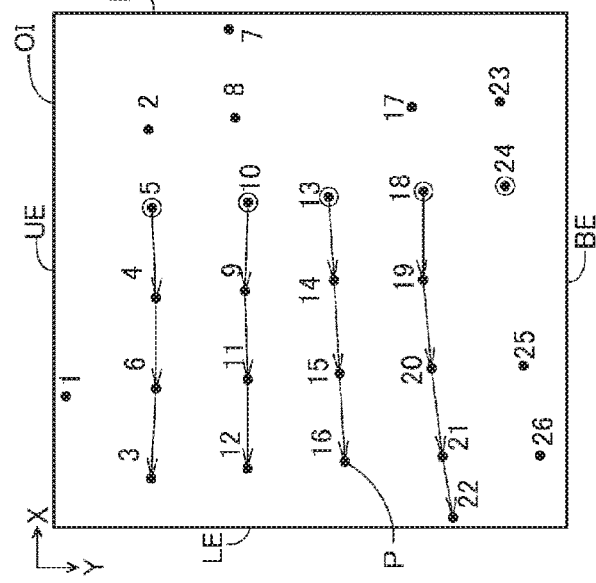

Each of FIGS. 11A to 11C conceptually depicts the search in S325 when the target end is one of the right end RE, the upper end UE, and the lower end BE. When the target end is the right end RE, as depicted in FIG. 11A, the search is performed in a left direction (the direction DR4 in FIG. 7) with the five reference points P(5), P(10), P(13), P(18), and P(24) arranged in a direction along the right end RE being the origins. This produces a search result MR depicted in FIG. 10B. When the target end is the upper end UE, as depicted in FIG. 11B, the search is performed in the lower direction (the direction DR2 in FIG. 7) with the five reference points P(3), P(6), P(4), P(5), and P(2) arranged in a direction along the upper end UE being the origins. This produces a search result MU depicted in FIG. 10C. When the target end is the lower end BE, as depicted in FIG. 11C, the search is performed in the upper direction (the direction DR3 in FIG. 7) with the five reference points P(21), P(20), P(19), P(18), and P(17) arranged in a direction along the lower end BE being the origins. This produces a search result MB depicted in FIG. 10D. It can be said that the search results ML, MR, MU, and MB depicted in FIGS. 10A to 10D are the pieces of information indicating the mapping relations between the reference points P and the pieces of matrix information.

In S28 of FIG. 2, the CPU 110 executes search result adjustment processing. The search result adjustment processing is processing of adjusting the search results ML, MR, MU, and MB of FIGS. 10A to 10D in the alignment processing; determining final mapping relations between the reference points and the pieces of matrix information; and generating position data PD (see FIG. 3C) based on the final mapping relations.

Figure 12A:
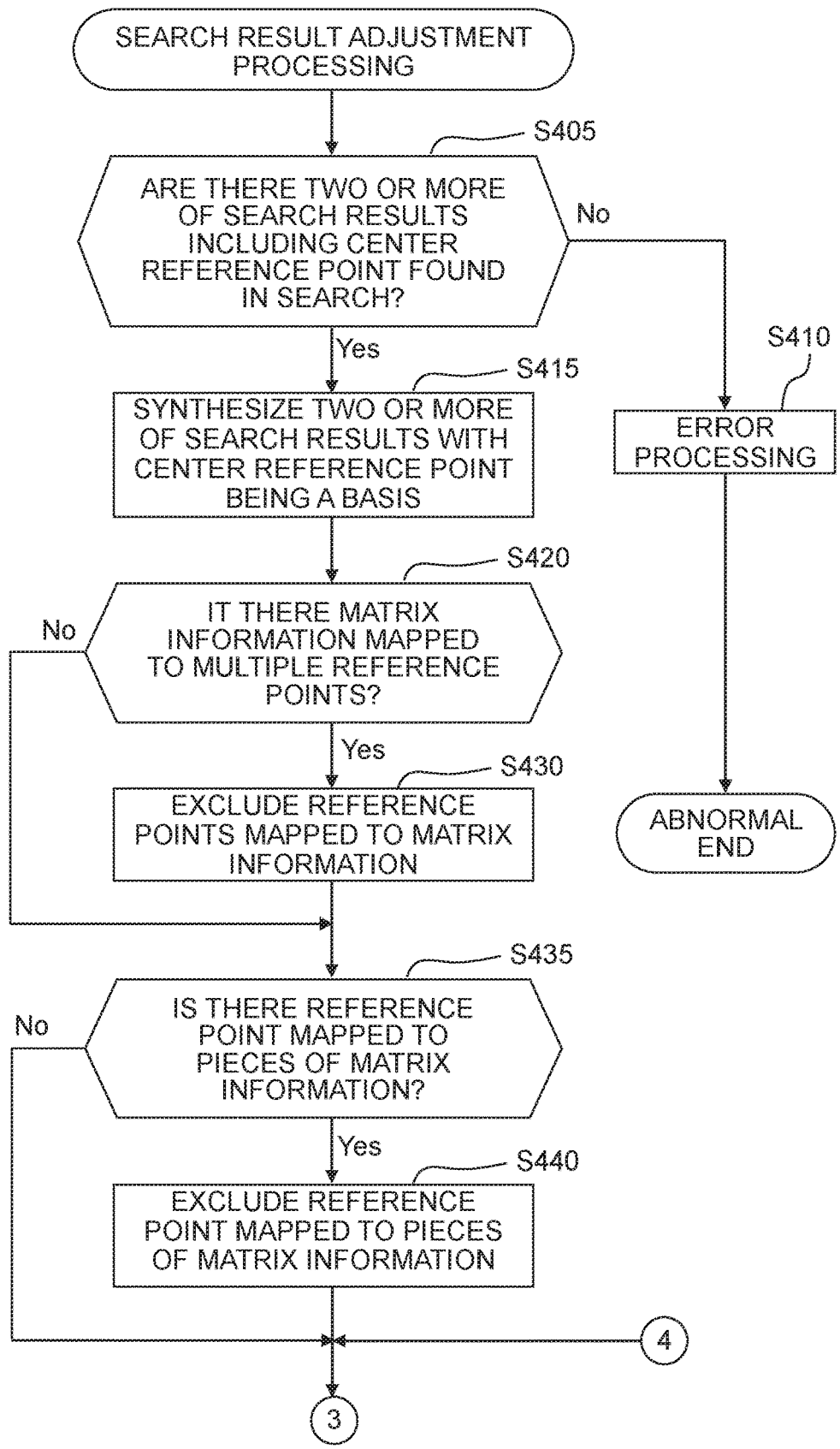
FIGS. 12A to 12D are a flowchart of search result adjustment processing.

In S405 of FIG. 12A, the CPU 110 determines whether two or more of the results ML, MR, MU, and MB include the center reference point Pg found in the search. As indicated by a square CS surrounded by a broken line in each of FIGS. 10A to 10D, the center reference point Pg (specifically, the reference point P(14)) has been found in each of the four search results ML, MR, MU, and MB.

When there are two or more of the search results including the center reference point Pg found in the search (S405: YES), the CPU 110 proceeds to S415. When there is less than two search results including the center reference point Pg found in the search (S405: NO), the CPU 110 executes, in S410, the error processing similar to S120 of FIG. 6, and abnormally ends the image processing. Because, in that case, it is considered that the search was not performed appropriately due to, for example, many noises in the center area CA1 including the center reference point Pg.

In S415, the CPU 110 synthesizes the four search results ML, MR, MU, and MB with the center reference point Pg being as a basis. The matrix in FIG. 10E depicts a synthetic search result FMTa as an exemplary synthetic search result FMT. The synthetic search result FMTa may be larger than the size of N rows and M columns (in FIG. 3A, 5 rows and 5 columns) corresponding to the number of circles C included in the sheet SH. In FIG. 10E, the synthetic search result FMT has a size of 6 rows and 6 columns.

In S420, the CPU 110 determines whether the matrix information mapped to multiple reference points P is present in the synthetic search result FMT. Namely, it is determined whether the mapping relation, in which the reference points P are mapped to the matrix information to satisfy Q1 to 1 (Q1 is an integer equal to or more than two), is included in the synthetic search result FMT. In the synthetic search result FMTa of FIG. 10E, all pieces of the matrix information are mapped to the reference points P to satisfy 1 to 1 or 0 to 1 (each square with "F"). Thus, the synthetic search result FMTa includes no mapping relation satisfying Q1 to 1.

FIG. 13A depicts a synthetic search result FMTb of 5 rows and 5 columns that is another example of the synthetic search result. In the synthetic search result FMTb, as depicted in a square IM1 positioned at the fourth row and the fifth column, two reference points P(17) and P(18) are mapped to a piece of matrix information (4, 5). Such a contradictory mapping relation may appear, for example, when one or both of the reference points P(17) and P(18) is/are erroneously identified due to the noise.

When there is the matrix information mapped to the reference points P (S420: YES), the CPU 110 excludes, in S430, the reference points mapped to the matrix information from the reference points as the output targets. Specifically, in FIG. 13A, the two reference points P(17) and P(18) mapped to the matrix information (4, 5) are excluded. For example, as depicted in a square IM1 of a synthetic search result FMTc after exclusion of FIG. 13B, information indicating that any reference point mapped was not found in the search ("F" in FIG. 13B) is mapped to the matrix information (4, 5).

When there is no matrix information mapped to the reference points P (S420: NO), the CPU 110 skips over S430.

In S435, is the CPU 110 determines whether there is a reference point mapped to the pieces of matrix information in the synthetic search result FMT. Namely, it is determined whether the mapping relation, in which the reference point P is mapped to the pieces of matrix information to satisfy 1 to Q2 (Q2 is an integer equal to or more than two), is included in the synthetic search result FMT. In the synthetic search result FMTa of FIG. 10E, all the pieces of matrix information are mapped to the reference points P to satisfy 1 to 1 or 0 to 1. Thus, the synthetic search result FMTa includes no mapping relation satisfying 1 to Q2.

In the synthetic search result FMTb of FIG. 13A, as indicated in a square IM2 of the fifth row and the first column and a square IM2 of the fifth row and the second column, a reference point P(25) is mapped to the two pieces of matrix information (5, 1) and (5, 2). Such a contradictory mapping relation may appear, for example, when the reference point P(25) is erroneously identified due to the noise.

When there is the reference point mapped to the pieces of matrix information (S435: YES), the CPU 110 excludes, in S440, the reference point mapped to the pieces of matrix information from the reference points as the output targets. Specifically, in FIG. 13A, the reference point P(25) mapped to the two pieces of matrix information (5, 1) and (5, 2) is excluded. Thus, as depicted in the two squares IM2 in the synthetic search result FMTc after exclusion of FIG. 13B, information indicating that any reference point mapped was not found in the search ("F" in FIG. 13B) is mapped to the two pieces of matrix information (5, 1) and (5, 2).

When there is no reference point P mapped to the pieces of matrix information (S435: NO), the CPU 110 skips over S440.

In S445, the CPU 110 determines whether the number of rows in the synthetic search result FMT is larger than its upper limit. When the circles C included in the sheet SH are arranged to form the N rows and M columns, the upper limit of the number of rows in the synthetic search result FMT is N. In FIG. 3A, the upper limit of the number of rows is 5 (N=5). The number of rows in the synthetic search result FMTa of FIG. 10E is 6. Thus, it is determined that the number of rows in the synthetic search result FMTa is larger than the upper limit.

When the number of rows in the synthetic search result FMT is larger than the upper limit (S445: YES), the CPU 110 deletes, in S450, a row having a small number of reference points mapped, of the rows at both ends, and returns to S445. In the synthetic search result FMTa of FIG. 10E, the number of reference points P in an upper end row UER is 1, and the number of reference points P in a lower end row BER is 3. Thus, the upper end row UER is deleted. When the number of rows in the synthetic search result FMT is larger than the upper limit, the deletion of one of the rows positioned at both ends is repeated until the number of rows in the synthetic search result FMT is equal to the upper limit.

The number of rows of the reference points P never exceeds the number of rows N of the circles C included in the sheet SH. Thus, when the synthetic search result FMT includes the number of rows of reference points P exceeding the number of rows N, it is highly likely that the reference point P positioned in at least one of the rows at both ends is erroneously identified. For example, a reference point P(1) in the upper end row UER in FIG. 10E is a point erroneously identified based on the noise NZ4 (see FIG. 3B).

When the number of rows in the synthetic search result FMT is equal to or less than the upper limit (S445: NO), the CPU 110 skips over S450 and proceeds to S455.

In S455, the CPU 110 determines whether the number of columns in the synthetic search result FMT is larger than its upper limit. When the circles C included in the sheet SH are arranged to form the N rows and M columns, the upper limit of the number of columns in the synthetic search result FMT is M. In FIG. 3A, the upper limit of the number of columns is 5 (M=5). The number of columns in the synthetic search result FMTa of FIG. 10E is 6. Thus, it is determined that the number of columns in the synthetic search result FMTa is larger than the upper limit.

When the number of columns in the synthetic search result FMT is larger than the upper limit (S455: YES), the CPU 110 deletes, in S460, a column, of the columns at both ends, having smaller number of reference points mapped and returns to S455. In the synthetic search result FMTa of FIG. 10E, the number of reference points P in a left end column LEC is 1, and the number of reference points P in a right end column REC is 3. Thus, the left end column LEC is deleted. When the number of columns in the synthetic search result FMT is larger than the upper limit, the deletion of one of the columns positioned at both ends is repeated until the number of columns in the synthetic search result FMT is equal to the upper limit.

The number of columns of the reference points P never exceeds the number of columns M of the circles C included in the sheet SH. Thus, when the synthetic search result FMT includes the number of columns of reference points P exceeding the number of columns M, it is highly likely that a reference point P positioned in at least one of the columns at both ends is erroneously identified. For example, a reference point P(22) in the left end column LEC in FIG. 10E is a point erroneously identified due to the noise NZ6 (see FIG. 3B).

When the number of columns in the synthetic search result FMT is equal to or less than the upper limit (S455: NO), the CPU 110 skips over S460 of FIG. 12B and proceeds to S465 of FIG. 12C. In S465, as depicted in FIG. 10E, a synthetic search result FMTs from which the row UER and the column LEC are deleted is data representing the reference points P found in the search that are mapped to the pieces of matrix information of 5 rows and 5 columns, which correspond to the circles C of 5 rows and 5 columns included in the sheet SH. In the synthetic search result FMTc of FIG. 13B, the number of rows and the number of columns are both equal to or less than the upper limits, and thus neither deletion of the row in S450 nor deletion of the column in S460 are executed.

In S465, the CPU 110 sets the four ends (i.e., the upper, lower, left, and right ends) in the synthetic search result FMT as processing targets.

In S470, the CPU 110 calculates the number of reference points P in the row and column of the end as the processing target. For example, in the synthetic search result FMTc of FIG. 13B, all of the four ends are the processing targets in the initial S470. Thus, the number of reference points P is calculated for each of an upper end row UERc, a lower end row BERc, a left end column LECc, and a right end column RECc.

In S475, the CPU 110 determines whether there is a row and column, of the rows and columns of the ends as the processing targets, having the number of reference points P that is equal to or less than a criterial value Rth. The criterial value Rth is, for example, a half of a maximum value of the number of reference values that may be included in the row and the column. Namely, the criterial value Rth for the row is (N/2), and the criterial value Rth for the column is (M/2). In FIG. 13B, the maximum values of the number of reference values for the row and the column are both 5, and thus it is determined whether there is a row and column, of the rows and columns of the ends as the processing targets, having the number of reference points P that is equal to or less than 2. In FIG. 13B, the number of reference points P in the lower end row BERc is 1, and the number of reference points P in the right end column RECc is 2. Thus, it is determined in the initial S475 that there is a row and column having the number of reference points P that is equal to or less than 2.

When there is a row and column having the number of reference points P that is equal to or less than the criterial value Rth (S475: YES), the CPU 110 proceeds to S480. When there is no row and column having the number of reference points P that is equal to or less than the criterial point Rth (S475: NO), the CPU 110 proceeds to S490.

In S480, the CPU 110 deletes, a row and a column, of the rows and columns of the ends as the processing targets, having the number of reference points P that is equal to or less than the criterial value Rth. In FIG. 13B, the lower end row BERc and the right end column RECc are deleted in the initial S480.

In S485, the CPU 110 excludes an end, of the ends as the processing targets, having the number of reference points P that exceeds the criterial value Rth, from the processing targets. In FIG. 13B, an upper end corresponding to the row UERc having five reference points and a left end corresponding to the column LECc having four reference points are excluded from the processing targets in the initial S485. After S485, the CPU 110 returns to S470.

In the S470 for the second time, the ends as the processing targets are the lower end and the right end in FIG. 13B. Thus, the current number of reference points P in a lower end row BERe and the current number of reference points P in a right end column RECe are calculated. In the S475 for the second time, the number of reference points P in the row BERe and the number of reference points P in the column RECe are larger than two. Thus, the CPU 110 proceeds to S490. FIG. 13C depicts a synthetic search result FMTd acquired by executing the processing of S465 to S480 on the synthetic search result FMTc depicted in FIG. 13B.

In S490, the CPU 110 determines whether the number of reference points P currently valid is equal to or more than a criterial value RVth. The number of valid reference points P is, for example, the number of reference points P mapped to the pieces of matrix information in the synthetic search result FMTd after processing. In FIG. 13C, the number of valid reference points P is 16. The criterial value RVth is, for example, a predefined fixed value. When the number of valid reference points P is equal to or more than the criterial value RVth (S490: YES), the CPU 110 proceeds to S495. When the number of valid reference points P is less than the criterial value RVth (S490: NO), the CPU 110 proceeds to S505.

In S495, the CPU 110 determines whether a distribution area in which the valid reference points P are distributed is equal to or more than a criterial ratio RRth. The criterial ratio RRth is a predefined ratio to an area of the photographed sheet image OI. The criterial value RVth and the criterial ratio RRth are determined, for example, by the method used for generating the characteristics data CD (see S30 of FIG. 2A). When the distribution area is equal to or more than the criterial ratio RRth (S495: YES), the CPU 110 proceeds to S500. When the distribution area is less than the criterial ratio RRth (S495: NO), the CPU 110 proceeds to S505.

In S500, the CPU 110 generates the position data PD (see FIG. 3C) based on the synthetic search result FMT after processing (e.g., the synthetic search result FMTs in FIG. 10E or the synthetic search result FMTd in FIG. 13C). It can be said that the synthetic search result FMT after processing is information indicating mapping relations between multiple reference points P and pieces of the matrix information (n, m).

In S505, the CPU 110 executes the error processing indicated in S260 of FIG. 6 to abnormally end the image processing. This is because it is difficult to generate, in S30 of FIG. 2A, the characteristics data CD with high accuracy when the number of valid reference points P is extremely small and/or the distribution area of the valid reference points P is extremely small.

According to the example described above, the CPU 110 acquires pieces of position information (the barycentric positions (Xc, Yc) in FIG. 5) indicating positions of the reference points P in the photographed sheet image OI (the object identification processing indicated in S22 of FIG. 2). In the alignment processing of FIG. 8, the CPU 110 analyzes the relative positional relations between the multiple reference points P with the left end LE being the target end (S305 of FIG. 8) to generate the search result ML in which pieces of alignment information are mapped to the reference points P (S310 to S330 of FIG. 8). Further, the CPU 110 analyzes the relative positional relations between the multiple reference points P with the right end RE being the target end (S305 of FIG. 8) to generate the search result MU in which pieces of alignment information are mapped to the multiple reference points P (S310 to S330 of FIG. 8). When a first mapping relation between a certain reference point and a piece of matrix information in the search result ML is different from a second mapping relation between the certain reference point and a piece of matrix information in the search result MU, the CPU 110 excludes the certain reference point from the output targets (S420 to S440 of FIG. 12A). The CPU 110 generates the position data PD by using two or more reference points P which are mapped to the pieces of matrix information and which do not include the certain excluded reference point P, as the reference points as the output targets (S500 of FIG. 12D). As a result, the certain reference point is excluded from the output targets when the first mapping relation is different from the second mapping relation. This generates the position data PD (see FIG. 3C) including the pieces of position information for the two or more reference points, as the output targets, which do not include the certain excluded reference point. Thus, it is possible to generate the position data PD including the pieces of position information that correctly indicate the positions of the reference points in the photographed sheet image OI. For example, the photographed sheet image OI may include a noise different from each circle object CO. This may cause a case in which the reference point is erroneously identified in the photographed sheet image OI due to the noise. Even in such a case, the first mapping relation and the second mapping relation are generated in accordance with the two different methods. When the first and second mapping relations are different from each other, the reference point related to the mapping relations different from each other is excluded from the output targets. This allows the portion data PD to be prevented from including any reference point erroneously identified due to the noise.

Specifically, for example, as depicted in FIG. 13A, when the matrix information (5, 1) is mapped to the reference point P(25) as the first mapping relation and when the matrix information (5, 2) different from the matrix information (5, 1) is mapped to the reference point P(25) as the second mapping relation (S435 of FIG. 12A: YES), the reference point P(25) is excluded from the output targets (S440). Thus, the reference point P(25) is appropriately excluded from the output targets based on the contradiction in the mapping relations.

Further, for example, as depicted in FIG. 13A, when the matrix information (4, 5) is mapped to the reference point P(17) as the first mapping relation and the matrix information (4, 5) is mapped to the reference point P(18) as the second mapping relation (S420 of FIG. 12A: YES), the reference points P(17) and P(18) are excluded from the output targets. Thus, the reference points P(17) and P(18) are appropriately excluded from the output targets based on the contradiction in the mapping relations.

In the example, when the target end is the left end LE, a reference point P is searched from criterial reference points P(3), P(12), P(16), P(21), and P(26) selected from multiple reference points P, in a right direction (the direction DR1 from the center reference point Pg to the neighborhood reference point P1 on the right side) (FIG. 9B and S325 of FIG. 8). Then, pieces of matrix information are mapped to the reference points P found in the search (e.g., the points P(11), P(9), and P(10) of FIG. 9B) (S330 of FIG. 8). When the target end is the upper end UE, a reference point P is searched from criterial reference points P(3), P(6), P(4), P(5), and P(2) selected from multiple reference points P, in the lower direction (the direction DR2 from the center reference point Pg to the neighborhood reference point P2 on the lower side) (FIG. 11B and S325 of FIG. 8). Then, pieces of matrix information are mapped to the reference points P found in the search (e.g., the points P(10), P(13), and P(18) of FIG. 11B) (S330 of FIG. 8). Accordingly, the reference point that is not found in the search with the target end being the left end LE (e.g., the reference point P(24)) is found in the search with the target end being the upper end UE. This enables pieces of matrix information to be mapped to more reference points P.

In the above example, the center reference point Pg, the neighborhood reference point P1 in the vicinity of the center reference point Pg, and the neighborhood reference point P2 positioned in a direction different from the neighborhood reference point P1 relative to the center reference point Pg are identified (S210 of FIG. 6). Then, the direction DR1 from the center reference point Pg to the neighborhood reference point P1 and the direction DR2 from the center reference point Pg to the neighborhood reference point P2 are identified (S255 of FIG. 6). This appropriately determines the search direction DR1 with the target end being the left end LE and the search direction DR2 with the target end being the upper end UE. Thus, when the target end is the left end LE in the alignment processing and when the target end is the upper end UE in the alignment processing, the reference points P can be appropriately searched and pieces of matrix information can be appropriately mapped to the reference points P found in the search.

In the above example, the neighborhood reference point P3 and the neighborhood reference point P4 that are positioned in directions different from the neighborhood reference points P1 and P2 relative to the center reference point Pg are identified (S210 of FIG. 6). Then, the direction DR3 from the center reference point Pg to the neighborhood reference point P3 and the direction DR4 from the center reference point Pg to the neighborhood reference point P4 are identified (S255 of FIG. 6). Then, for example, when the target end is the left end LE, a reference point P is searched in the four directions DR1 to DR4. For example, as depicted in FIG. 9A, the search is performed in the direction DR4 in S310 of FIG. 8; the search is performed in the directions DR2 and DR3 in S315 of FIG. 8; and the search is performed in the direction DR1 in S325 of FIG. 8. The search in the four directions DR1 to DR4 allows pieces of matrix information to be mapped to more reference points P.

Figure 12B:
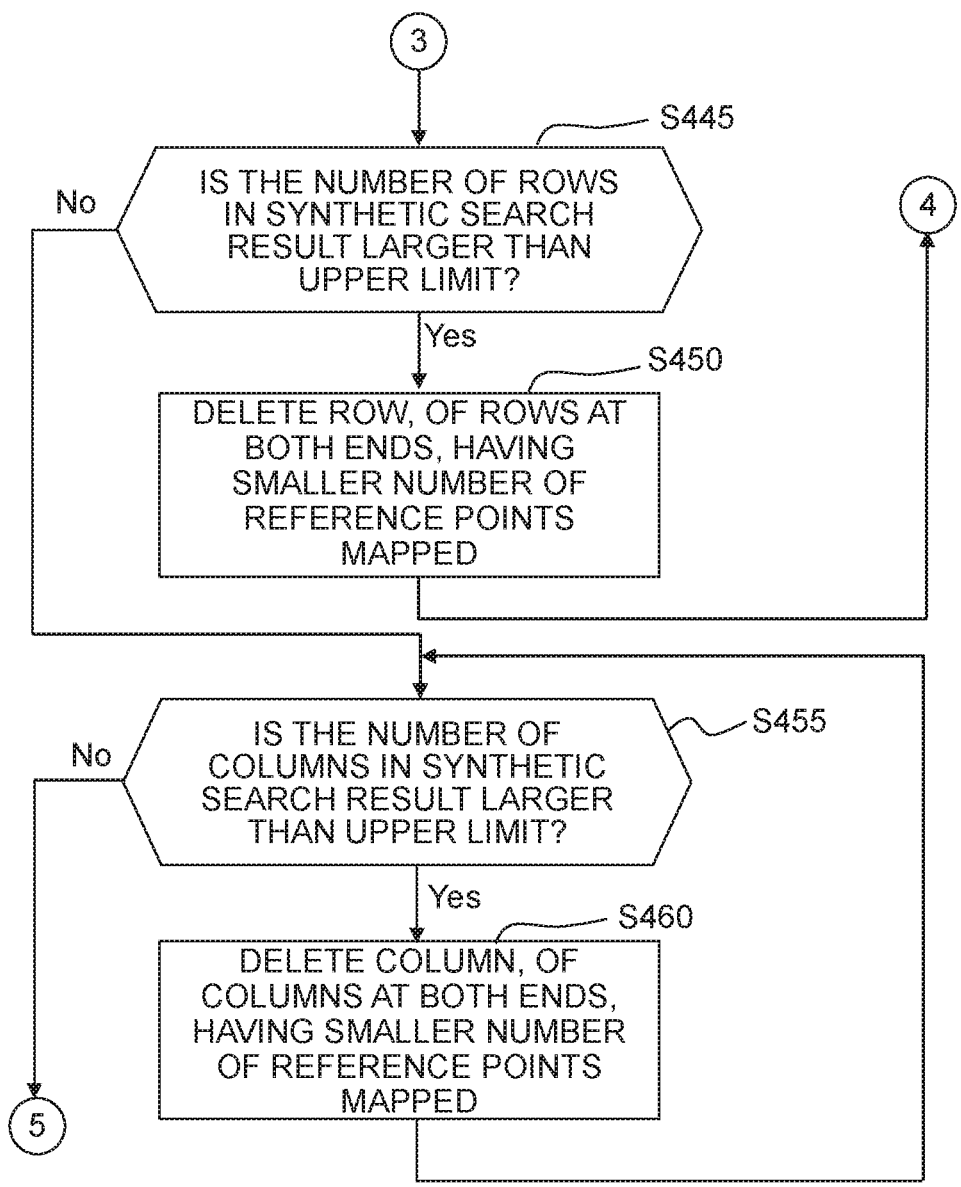
Figure 12C:
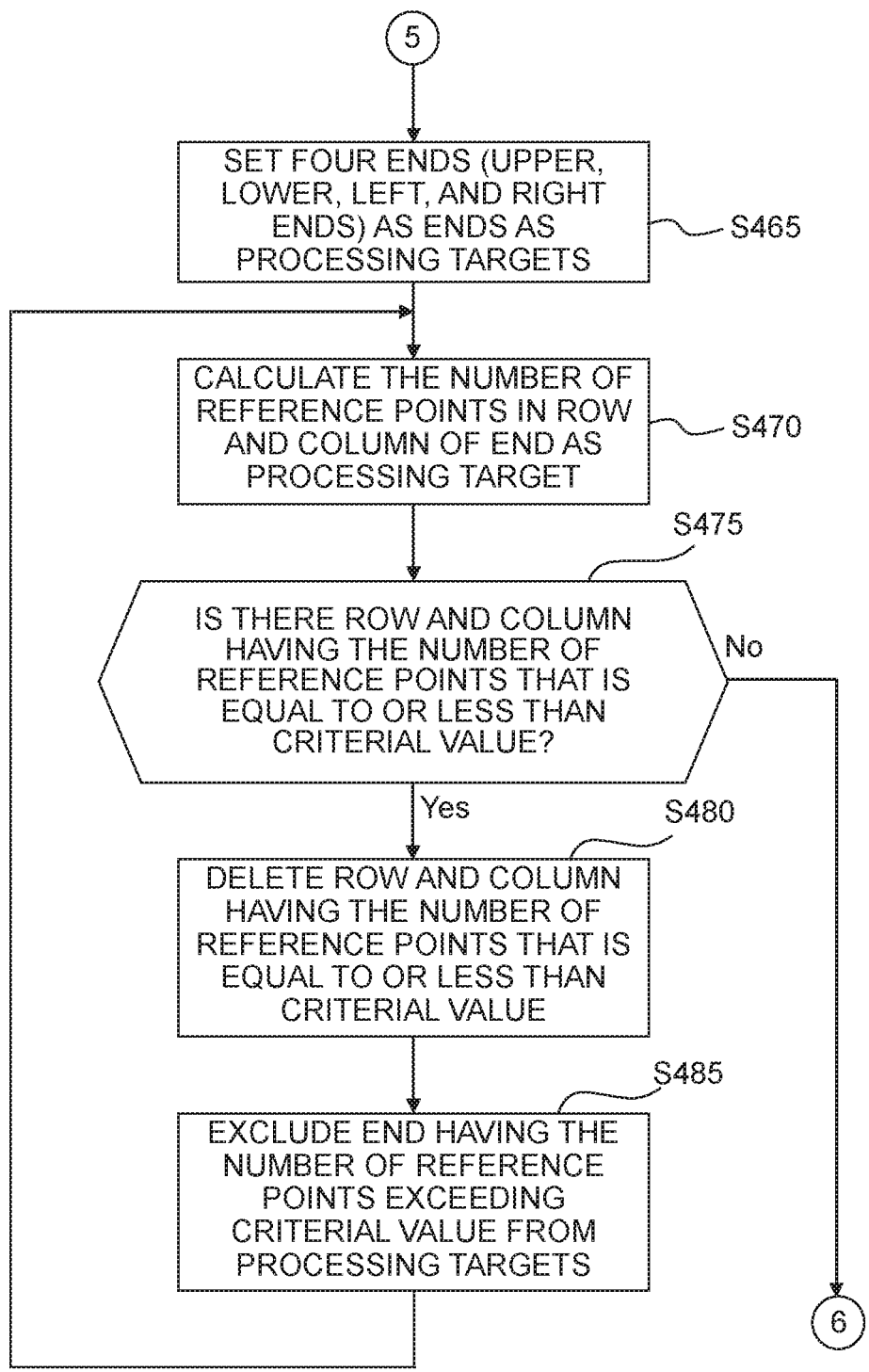
Figure 12D:
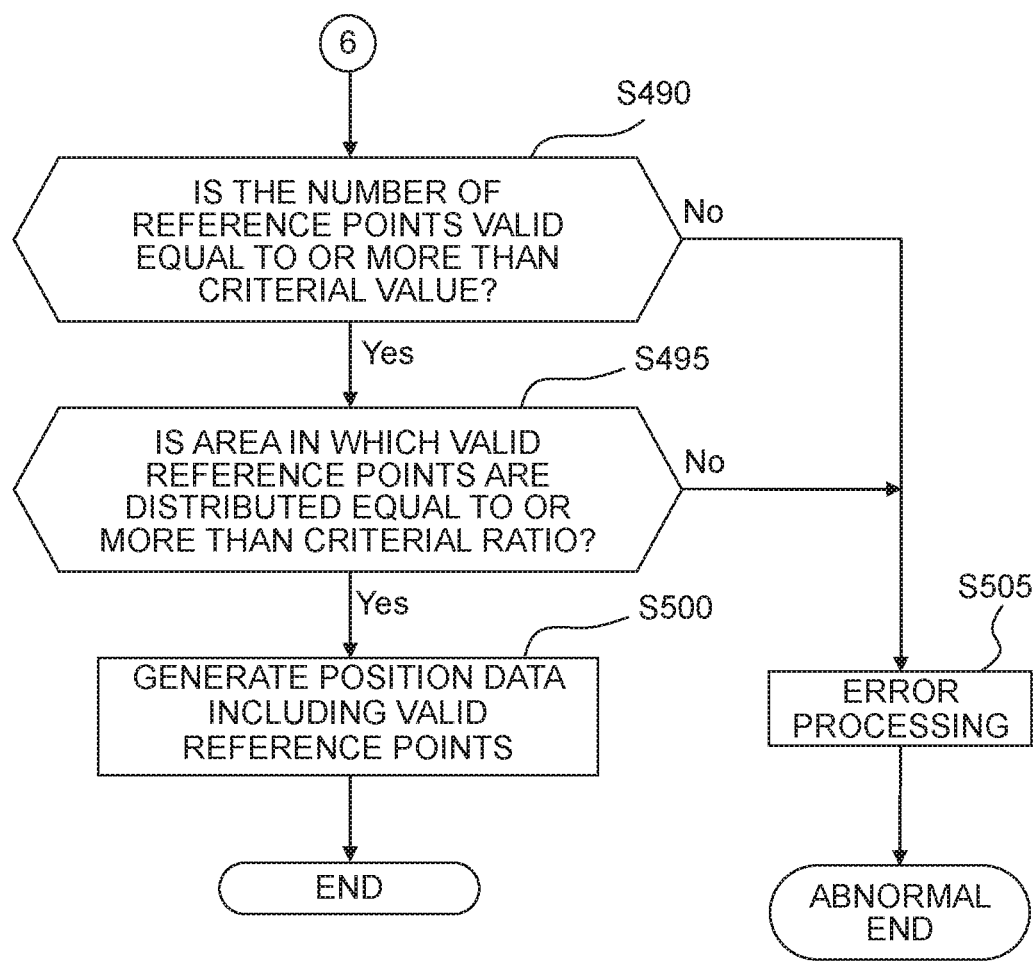

In the above example, in the search result adjustment processing indicated in FIGS. 12A to 12D, for example, the number of reference points P arranged in the right end column RECc (the column positioned at the end in the right direction) and the number of reference points P arranged in the lower end row BERc (the row positioned at the end in the lower direction intersecting with the right direction) in the synthetic search result FMTc of FIG. 13B are identified (S470 of FIG. 12C). When the number of reference points P arranged in the right end column RECc is equal to or less than the criterial value Rth (S475 of FIG. 12C: YES), the reference points P arranged in the right end column RECc are excluded from the reference points as the output targets (S480 of FIG. 12C). Similarly, when the number of reference points P arranged in the lower end row BERc is equal to or less than the criterial value Rth (S475 of FIG. 12C: YES), the reference points P arranged in the lower end row BERc are excluded from the reference points as the output targets (S480 of FIG. 12C). When the number of reference points P positioned in the vicinity of each end is relatively small, the reference points should not be used for generation of the characteristics data CD. This is because, for example, those reference points may be reference points that are erroneously identified based on an isolated noise. In this example, since those reference points are excluded from the reference points as the output targets, the position data PD can be generated more appropriately.

As described above, the processing of S310 to S330 of FIG. 8 executed when the target end is the left end LE can be referred to as an analysis in accordance with a first method, and the processing of S310 to S330 of FIG. 8 executed when the target end is the upper end UE can be referred to as an analysis in accordance with a second method. The matrix information (a, b) can be referred to as relative information indicating a relative positional relation between multiple reference points P.

MODIFIED EXAMPLES (1) In the above example, the image indicating the reference point RP printed on the sheet SH is the circle C. Namely, the object indicating the reference point P included in the photographed sheet image OI is the circle object CO. The present teaching, however, is not limited thereto. The object indicating the reference point P may be a lattice-like object in which first straight lines parallel to an X direction intersect with second straight lines parallel to a Y direction. In that case, the reference points P may be positioned, for example, at positions where the first straight lines intersect with the second straight lines. Further, the object indicating the reference point P may have, for example, a checkered pattern.

(2) In the image processing of the above example, the processing of S310 to S330 of FIG. 8 executed when the target end is the left end LE is executed as the analysis in accordance with the first method, and the processing of S310 to S330 of FIG. 8 executed when the target end is the upper end UE is executed as the analysis in accordance with the second method. The present teaching, however, is not limited thereto. For example, the following method may be adopted as any one of the analysis in accordance with the first method and the analysis in accordance with the second method. The CPU 110 determines the center reference point Pg of the photographed sheet image OI. Next, the CPU searches eight reference points P (e.g., the reference points P(11), P(9), P(10), P(13), P(18), P(19), P(20), and P(15) in FIG. 7) surrounding the center reference point Pg in a predefined search range having the center reference point Pg as the center. Then, the CPU 110 searches 16 reference points P surrounding the eight reference points P by expanding the search range. As described above, the method searching the reference points P while gradually expanding the search range having the center reference point Pg as the center may be adopted. Or, the CPU 110 sets a belt-like search area along the left end LE and then searches reference points P for one column (e.g., five reference points P) while expanding a width of the belt-like search area in an X direction. After searching the reference points P (e.g., the five reference points P) for one column, the CPU 110 sets a new belt-like search area on the right of the above belt-like search area, and searches reference points P for one column in the new search area. As described above, the method of searching reference points P column by column or row by row by use of the belt-like search area, may be adopted.

(3) In the above example, the matrix information (a, b) is used as the relative information. The present teaching, however, is not limited thereto. For example, serial numbers indicating an order of arrangement of pieces of position information in the position data PD, may be adopted as the pieces of relative information. For example, if there are 25 reference points P of 5 rows and 5 columns, like FIG. 3A, serial numbers 1 to 25 having the mapping relations with the positions of 25 circles in the sheet SH may be adopted as the pieces of relative information.

(4) In the above example, the characteristics data CD including the parameter matrix CM and the distortion coefficient DC is generated by using the position data PD. Instead of this, information (e.g., a rotation vector) indicating, for example, a position relation between a coordinate system of the camera and a coordinate system of a photographed object (e.g., the sheet SH) may be generated by using the position data PD.

(5) In the above example, the function "cvCalibrateCamera2" disclosed in OpenCV is used to generate the characteristics data CD. In order to generate the characteristics data CD, it may be possible to use any other program that calculates the characteristics data CD in accordance with, for example, a known model for camera calibration (e.g., Tsai model or Zhang model).

(6) The image processing of the above example can be changed appropriately. For example, in the search result adjustment processing depicted in FIGS. 12A to 12D, one of the processing of S420 and S430 and the processing of S435 and 440 may be omitted. For example, when the processing of S420 and S430 is omitted, two reference points P mapped to a certain piece of alignment information may be present. In that case, one of the two reference points P is selected as the reference point mapped to the certain piece of alignment information.

Or, instead of executing the processing of S445 to S460 in FIG. 12B, for example, the CPU 110 may appropriately delete row(s) and column(s) positioned at each end so that the center reference point Pg is positioned at the center of the matrix of n rows and m columns to be outputted. Further, the processing of S465 to S485 in FIG. 12C and all or part of the processing of S490 may be appropriately omitted.

In the S105 of the object identification processing in FIG. 4, when the center of gravity of the reference range RA matches the center of gravity of one circle object CO, the size of the reference range RA is determined so that the reference range RA includes the entirety of the circle object CO. The present teaching is not limited thereto. When the photographed sheet image OI includes K pieces of circle object CO (K is an integer equal to or more than two), the size of the reference range RA may be determined so that the reference range RA includes not less than one circle object CO and not more than L pieces of circle object CO (L is an integer less than K). This provides an advantage in which the calculation time is shorter as a value of L is smaller.

In S105, the size of the reference range RA is determined for each photographed sheet image OI by using, for example, the width Wo of the long side of the photographed sheet image OI. Instead of this, when the center of gravity of one circle object CO matches the center of gravity of the reference range RA, the size of the reference range RA may be determined to a predefined fixed value so that the reference range RA includes a predefined number of circle objects CO.

The CPU 110 may not determine the reference range RA and may execute the binarization processing in S110 by making the predefined fixed value the binary threshold.

All or part of the processing of S130 to S145 in the object identification processing indicated in FIG. 4 may be omitted. For example, only the processing of S130 and S135 may be executed and the processing of S140 and S145 may be omitted.

(7) In the print processing in FIG. 2B, printing is performed by using the corrected image data. The present teaching, however, is not limited thereto. Any other output processing, such as display of the corrected image data on the display unit 140, may be executed by using the corrected image data. The corrected image data may be stored in the non-volatile storage 130 for use by a user.

(8) The image processing apparatus achieving the image processing of FIGS. 2A and 2B is not limited to the terminal 100, and may be any other apparatus. For example, a CPU of the printing apparatus 200 may generate the characteristics data CD by executing the characteristics data generation processing in FIG. 2A by use of photographed sheet image data generated by the terminal 100 or any other digital camera. In that case, the printing apparatus 200 stores the characteristics data CD while mapping it to the terminal 100 or the any other digital camera. When printing is performed by using printing-target photographed image data generated by the terminal 100 or the any other digital camera, the CPU of the printing apparatus 200 executes the print processing of FIG. 2B by using the characteristics data CD mapped to the terminal 100 or the any other digital camera. Or, for example, a server (not depicted) that is connected to the terminal 100 and the printing apparatus 200 to communicate with each other may execute the characteristics data generation processing in FIG. 2A by using the photographed sheet image data acquired from the terminal 100 or the printing apparatus 200. In that case, the characteristics data CD generated may be transmitted to and stored in the terminal 100 or the printing appratus 200. The server may be constructed from computers that can communicate with each other via the network (e.g., a cloud server). In that case, for example, each of the computers may execute some of the characteristics data generation processing of FIG. 2A so that the entirety of the characteristics data generation processing is achieved by all of the computers. In that case, the entirety of the computers is an exemplary image preprocessing apparatus.

(9) In each of the examples, the configuration achieved by hardware may be partially replaced with software. Instead, the configuration achieved by software may be partially or entirely replaced with hardware.

As above, the present teaching has been explained with the example and modified examples. The embodiments described above are provided to facilitate understanding of the present teaching, and the present teaching is not limited to those. The present teaching may be changed or modified without departing from the gist and the scope of the claims below, and includes equivalents thereof.

What is claimed is:

1. A non-transitory computer-readable medium storing a program executable by a computer that, when executed by a processor of the computer, causes the computer to:
   acquire photographed image data which is generated by photographing, in an imaging apparatus, a photographed object indicating multiple reference points arranged regularly, the photographed image data indicating a photographed image of the photographed object;
   acquire pieces of position information which indicate positions of the multiple reference points in the photographed image by use of the photographed image data;
   map pieces of relative information to the respective reference points by analyzing relative positional relations between the multiple reference points in accordance with a first method using the pieces of position information, the relative information indicating the relative positional relations between the multiple reference points;
   map the pieces of relative information to the respective reference points by analyzing relative positional relations between the multiple reference points in accordance with a second method using the pieces of position information;
   determine a certain reference point as a reference point to be excluded, in a case that a first mapping relation between the certain reference point and one of the pieces of relative information mapped in accordance with the first method is different from a second mapping relation between the certain reference point and the one of the pieces of relative information mapped in accordance with the second method; and
   generate position data which includes the pieces of position information of reference points, among the multiple reference points, as output targets, based on mapping relations between the reference points as the output targets and the pieces of relative information, the reference points as the output targets being two or more reference points which are mapped to the pieces of relative information, the reference points as the output targets not including the reference point to be excluded.

2. The medium according to claim 1, wherein the certain reference point is determined as the reference point to be excluded, in a case that first relative information of the pieces of relative information is mapped to the certain reference point as the first mapping relation and second relative information, of the pieces of relative information, different from the first relative information is mapped to the certain reference point as the second mapping relation.

3. The medium according to claim 1,
   wherein a first reference point and a second reference point different from the first reference point are determined as the reference points to be excluded in a case that certain relative information of the pieces of relative information is mapped to the first reference point as the first mapping relation and the certain relative information is mapped to the second reference point as the second mapping relation.

4. The medium according to claim 1,
   wherein each of the reference points is searched in a first direction from a first criterial reference point selected from the multiple reference points and each of the pieces of relative information is mapped to one of the reference points found in the search, and
   each of the reference points is searched in a second direction different from the first direction, from a second criterial reference point selected from the multiple reference points and each of the pieces of relative information is mapped to one of the reference points found in the search.

5. The medium according to claim 4, wherein the program causes the computer to further:
   identify multiple neighborhood reference points which include: a center reference point positioned in a center portion of an area where the multiple reference points are arranged; a first neighborhood reference point; and a second neighborhood reference point positioned in a direction different from the first neighborhood reference point relative to the center reference point, the multiple neighborhood reference points being two or more reference points, of the multiple reference points except for the center reference point, closest to the center reference point, and identify a direction from the center reference point to the first neighborhood reference point as the first direction and identify a direction from the center reference point to the second neighborhood reference point as the second direction.

6. The medium according to claim 5,
wherein a third neighborhood reference point and a fourth neighborhood reference point, of the neighborhood reference points, are identified, the third neighborhood reference point being positioned in a direction different from the first and second neighborhood reference points relative to the center reference point, the fourth neighborhood reference point being positioned in a direction different from the first, second, and third neighborhood reference points relative to the center reference point, a third direction from the center reference point to the third neighborhood reference point and a fourth direction from the center reference point to the fourth neighborhood reference point are identified, and in each of the first method and the second method, the pieces of relative information are mapped to the respective reference points found by searching the reference points along the first, second, third, and fourth directions.

7. The medium according to claim 1, wherein the program causes the computer to further:
identify the number of a first set of end reference points arranged at an end in a certain direction and the number of a second set of end reference points arranged at an end in a direction intersecting with the certain direction, the first set of end reference points and the second set of end reference points being included in a third set of two or more reference points which are mapped to the pieces of relative information, the third set of reference points not including the certain reference point; and exclude the first set of end reference points from the reference points as the output targets in a case that the number of the first set of end reference points is equal to or less than a first number, and exclude the second set of end reference points from the reference points as the output targets in a case that the number of the second set of end reference points is equal to or less than a second number.

8. The medium according to claim 1, wherein the photographed image includes objects indicating K pieces of the reference points, K being an integer equal to or more than two, the program causes the computer to further:
determine a size of a reference range such that the reference range includes at least one object whose center of gravity matches the center of gravity of the reference range and not more than L objects, L being an integer less than K; and generate binary data of the photographed image data by binarizing a target pixel in the reference range based on a threshold value determined by using values of pixels in the reference range, and acquire pieces of position information indicating positions of the reference points in the photographed image by using the binary data.

9. The medium according to claim 8, wherein the size of the reference range is determined by using a value which is acquired by dividing a value based on the number of pixels in a direction along a side of the photographed image by a value based on the number of objects indicating the reference points arranged in the direction along the side of the photographed image.

10. The medium according to claim 1, wherein the program causes the computer to further:
identify multiple objects in the photographed image by use of the photographed image data;
determine a criterial range of the number of pixels of an object based on the number of pixels of at least part of the multiple objects; and
determine whether each of the multiple objects is an object indicating the reference points based on whether the number of pixels of said each of the multiple objects is within the criterial range, and
acquire pieces of position information indicating positions of the reference points in the photographed image based on the multiple objects indicating the reference points.

11. The medium according to claim 1, wherein the program causes the computer to further:
identify multiple objects in the photographed image by use of the photographed image data;
identify, for each of the multiple objects, a size ratio of a size in a certain direction to a size in a direction intersecting with the certain direction; and
determine whether each of the multiple objects is an object indicating the reference point based on whether each of the multiple objects has a size ratio within a certain range, and
acquire pieces of position information indicating positions of the reference points in the photographed image based on the multiple objects indicating the reference points.

12. The medium according to claim 1, wherein the program causes the computer to further:
identify multiple objects in the photographed image by use of the photographed image data; and
determine that an object, of the multiple objects, which is in contact with an end of the photographed image, is not an output target, and
acquire pieces of position information indicating positions of the reference points in the photographed image based on the multiple objects indicating the reference points.

13. The medium according to claim 1, wherein the program causes the computer to further:
correct distortion of an image of image data by use of characteristics data based on the position data and generating corrected image data, the image data being generated by the imaging apparatus and different from the photographed image data; and
generate printing data by use of the corrected image data.

14. An image processing method, comprising:
acquiring photographed image data which is generated by photographing, in an imaging apparatus, a photographed object indicating multiple reference points arranged regularly, the photographed image data indicating a photographed image of the photographed object;

acquiring pieces of position information which indicate positions of the multiple reference points in the photographed image by use of the photographed image data;

mapping pieces of relative information to the respective reference points by analyzing relative positional relations between the multiple reference points in accordance with a first method using the pieces of position information, the relative information indicating the relative positional relations between the multiple reference points;

mapping the pieces of relative information to the respective reference points by analyzing the relative positional relations between the multiple reference points in accordance with a second method using the pieces of position information;

determining a certain reference point as a reference point to be excluded, in a case that a first mapping relation between the certain reference point and one of the pieces of relative information mapped in accordance with the first method is different from a second mapping relation between the certain reference point and the one of the pieces of relative information mapped in accordance with the second method; and generating position data which includes the pieces of position information of reference points, among the multiple reference points, as output targets, based on mapping relations between the reference points as the output targets and the pieces of relative information, the reference points as the output targets being two or more reference points which are mapped to the pieces of relative information, the reference points as the output targets not including the reference point to be excluded.

15. An image processing apparatus, comprising a processor and a memory configured to store instructions, wherein the instructions, when executed by the processor, cause the image processing apparatus to:

acquire photographed image data which is generated by photographing, in an imaging apparatus, a photographed object indicating multiple reference points arranged regularly, the photographed image data indicating a photographed image of the photographed object;

acquire pieces of position information which indicate positions of the multiple reference points in the photographed image by use of the photographed image data;

map pieces of relative information to the respective reference points by analyzing relative positional relations between the multiple reference points in accordance with a first method using the pieces of position information, the relative information indicating the relative positional relations between the multiple reference points;

map the pieces of relative information to the respective reference points by analyzing the relative positional relations between the multiple reference points in accordance with a second method using the pieces of position information;

determine a certain reference point as a reference point to be excluded, in a case that a first mapping relation between the certain reference point and one of the pieces of relative information mapped in accordance with the first method is different from a second mapping relation between the certain reference point and the one of the pieces of relative information mapped in accordance with the second method; and generate position data which includes the pieces of position information of reference points, among the multiple reference points, as output targets, based on mapping relations between the reference points as the output targets and the pieces of relative information, the reference points as the output targets being two or more reference points which are mapped to the pieces of relative information, the reference points as the output targets not including the reference point to be excluded.

16. The image processing apparatus according to claim 15, wherein the certain reference point is determined as the reference point to be excluded, in a case that first relative information of the pieces of relative information is mapped to the certain reference point as the first mapping relation and second relative information, of the pieces of relative information, different from the first relative information is mapped to the certain reference point as the second mapping relation.

17. The image processing apparatus according to claim 15,
wherein a first reference point and a second reference point different from the first reference point are determined as the reference points to be excluded in a case that certain relative information of the pieces of relative information is mapped to the first reference point as the first mapping relation and the certain relative information is mapped to the second reference point as the second mapping relation.

18. The image processing apparatus according to claim 15,
wherein each of the reference points is searched in a first direction from a first criterial reference point selected from the multiple reference points and each of the pieces of relative information is mapped to one of the reference points found in the search, and
each of the reference points is searched in a second direction different from the first direction, from a second criterial reference point selected from the multiple reference points and each of the pieces of relative information is mapped to one of the reference points found in the search.

19. The image processing apparatus according to claim 18, wherein the instructions cause the image processing apparatus to further:
identify multiple neighborhood reference points which include: a center reference point positioned in a center portion of an area where the multiple reference points are arranged; a first neighborhood reference point; and a second neighborhood reference point positioned in a direction different from the first neighborhood reference point relative to the center reference point, the multiple neighborhood reference points being two or more reference points, of the multiple reference points except for the center reference point, closest to the center reference point, and
identify a direction from the center reference point to the first neighborhood reference point as the first direction and identifying a direction from the center reference point to the second neighborhood reference point as the second direction.

20. The image processing apparatus according to claim 19,
wherein a third neighborhood reference point and a fourth neighborhood reference point, of the neighborhood reference points, are identified, the third neighborhood reference point being positioned in a direction different from the first and second neighborhood reference points relative to the center reference point, the fourth neighborhood reference point being positioned in a direction different from the first, second, and third neighborhood reference points relative to the center reference point, a third direction from the center reference point to the third neighborhood reference point and a fourth direction from the center reference point to the fourth neighborhood reference point are identified, and in each of the first method and the second method, the pieces of relative information are mapped to the respective reference points found by searching the reference points along the first, second, third, and fourth directions.

* * * * *